United States Patent [19]
Lee et al.

[11] Patent Number: 5,822,135
[45] Date of Patent: *Oct. 13, 1998

[54] LENS DEVICE INCLUDING A LIGHT CONTROLLING MECHANISM AND AN OPTICAL PICKUP APPARATUS USING A LENS DEVICE

[75] Inventors: Chul-woo Lee; Dong-ho Shin, both of Seoul; Kyung-hwa Rim, Suwon; Chong-sam Chung, Sung Nam; Kun-ho Cho, Suwon; Pyong-yong Seong; Jang-hoon Yoo, both of Seoul; Yong-hoon Lee, Suwon, all of Rep. of Korea

[73] Assignee: Samsung Electronics Co., Ltd., Suwon, Rep. of Korea

[*] Notice: The term of this patent shall not extend beyond the expiration date of Pat. No. 5,665,957.

[21] Appl. No.: 640,474

[22] Filed: May 1, 1996

[30] Foreign Application Priority Data

| Aug. 30, 1995 | [KR] | Rep. of Korea | 1995-27715 |
| Sep. 25, 1995 | [KR] | Rep. of Korea | 1995-31679 |
| Oct. 4, 1995 | [KR] | Rep. of Korea | 1995-33914 |
| Jan. 25, 1996 | [KR] | Rep. of Korea | 1996-1605 |
| Feb. 14, 1996 | [KR] | Rep. of Korea | 1996-3605 |

[51] Int. Cl.$^6$ .................................................. G02B 9/00
[52] U.S. Cl. ............................................................ 359/738
[58] Field of Search .................................... 359/719, 721, 359/722, 737, 738, 363; 357/723; 369/49.24, 112, 118; 250/201.2, 201.4, 201.5, 201.6, 208.2, 208.6; 354/112, 114, 115, 119, 400

[56] References Cited

U.S. PATENT DOCUMENTS

| 1,646,292 | 10/1927 | Hough | 372/98 |
| 2,724,305 | 11/1955 | Brandt | 356/273 |
| 3,913,076 | 10/1975 | Lehureau et al. | 340/173 LT |
| 3,971,002 | 7/1976 | Bricot et al. | 340/173 LT |
| 4,465,369 | 8/1984 | Saegusa et al. | 356/222 |
| 4,507,772 | 3/1985 | Yamamoto | 369/109 |
| 4,695,158 | 9/1987 | Kotaka et al. | 356/123 |
| 4,704,024 | 11/1987 | Tsunekawa | 354/432 |
| 4,712,885 | 12/1987 | Dawson et al. | 350/443 |
| 4,816,665 | 3/1989 | Hsu | 250/201 |
| 4,843,227 | 6/1989 | Matsui et al. | 250/201 |
| 4,882,478 | 11/1989 | Hayashi et al. | 250/211 R |
| 5,146,258 | 9/1992 | Bell et al. | 354/432 |
| 5,148,317 | 9/1992 | Foresi | 359/566 |
| 5,235,581 | 8/1993 | Miyagawa et al. | 369/44.12 |
| 5,281,797 | 1/1994 | Tatsuno et al. | 250/201.5 |
| 5,381,394 | 1/1995 | Yanagawa | 369/100 |
| 5,416,757 | 5/1995 | Luecke et al. | 369/44.23 |
| 5,446,565 | 8/1995 | Komma et al. | 250/216 |
| 5,453,607 | 9/1995 | Ando et al. | 250/201.5 |
| 5,496,995 | 3/1996 | Kato et al. | 250/216 |

(List continued on next page.)

FOREIGN PATENT DOCUMENTS

| 0 492 844 A2 | 7/1992 | European Pat. Off. . |
| 6-295467 | 10/1994 | Japan . |
| 7-98431 | 4/1995 | Japan . |
| 7-302437 | 11/1995 | Japan . |
| WO 96/28816 | 9/1996 | WIPO . |

OTHER PUBLICATIONS

Y. Komma et al., "Dual Focus Optical head for 0.6 mm and 1.2 mm Disks," *Optical Review*, vol. 1, No. 1, 1994, pp. 27–29.

*Primary Examiner*—Frank G. Font
*Assistant Examiner*—Michael P. Stafira
*Attorney, Agent, or Firm*—Burns, Doane, Swecker & Mathis, L.L.P.

[57] ABSTRACT

A lens device which can be used as an objective lens in an optical pickup apparatus includes an objective lens provided along a light path facing a disc and having a predetermined effective diameter, and light controlling means provided along the light path for controlling the light in an intermediate region between near and far axes of an incident light beam, thus providing a simplified and inexpensive device for using discs of differing thickness in a single disc drive, by reducing the spherical aberration effect.

26 Claims, 32 Drawing Sheets

U.S. PATENT DOCUMENTS

| | | | |
|---|---|---|---|
| 5,502,001 | 3/1996 | Okamoto | 437/173 |
| 5,524,018 | 6/1996 | Adachi | 372/98 |
| 5,526,336 | 6/1996 | Park et al. | 369/94 |
| 5,526,338 | 6/1996 | Hasman et al. | 369/109 |
| 5,565,986 | 10/1996 | Knuttel | 356/346 |
| 5,614,199 | 3/1997 | Tatsuno et al. | 369/112 |
| 5,621,717 | 4/1997 | Finkelstein et al. | 369/112 |
| 5,665,957 | 9/1997 | Lee et al. | 250/201.5 |

FIG. 7B
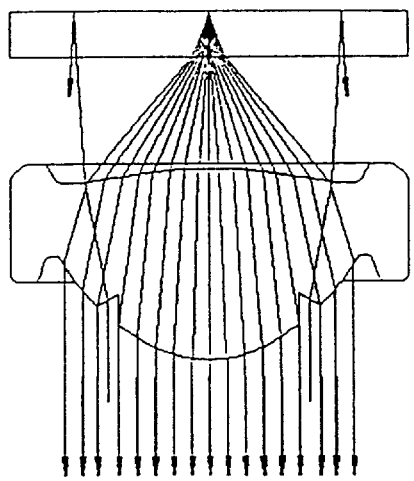
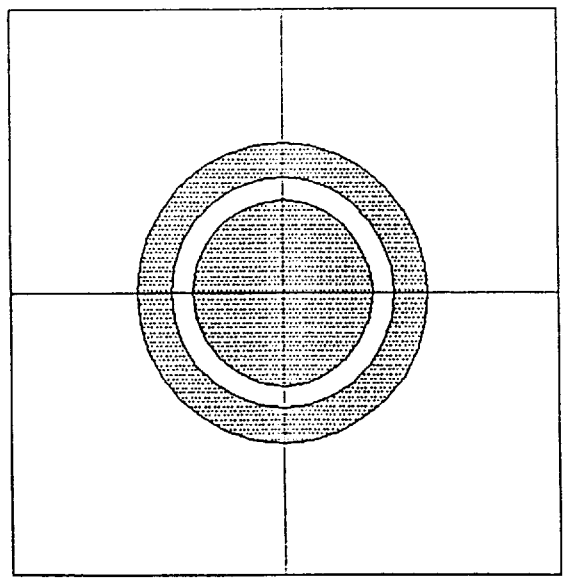

FIG. 7C
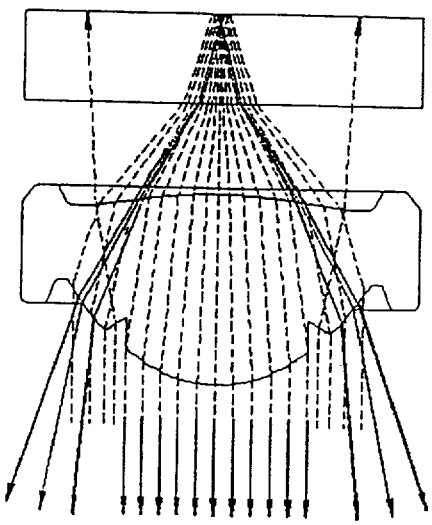
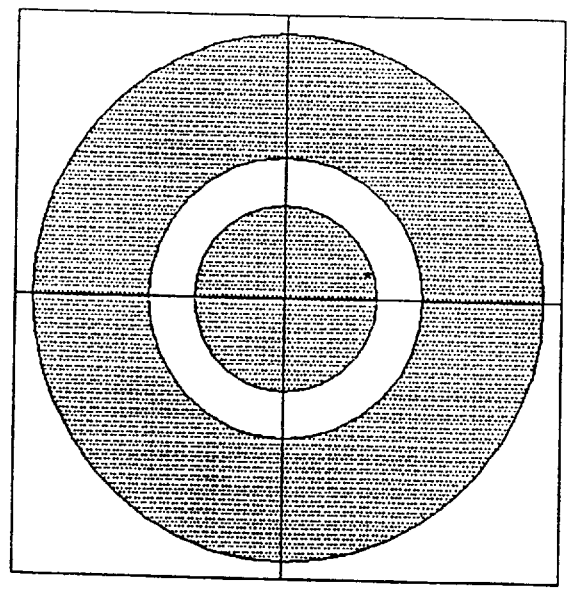

LENS DEVICE INCLUDING A LIGHT CONTROLLING MECHANISM AND AN OPTICAL PICKUP APPARATUS USING A LENS DEVICE

BACKGROUND OF THE INVENTION

The present invention relates to a lens device and method of making same, a method of obtaining a stable focus servo signal, an optical pickup adopting the same, a method of discriminating discs having different thicknesses and a method of reproducing/recording information from/onto the discs.

An optical pickup records and reproduces information such as video or audio data onto/from recording media, e.g., discs (or disks). A disc has a structure that an information-recorded surface is formed on a substrate. For example, the substrate can be made of plastic or glass. In order to read or write information from a high-density disc, the diameter of the optical spot must be very small. To this end, the numerical aperture of an objective lens is generally made large and a light source having a shorter wavelength is used. However, in case of using the shorter wavelength light source, a tilt allowance of the disc with respect to optical axis is reduced. The thus-reduced disc tilt allowance can be increased by reducing the thickness of the disc.

Assuming that the tilt angle of the disc is θ, the magnitude of a coma aberration coefficient $W_{31}$ can be obtained from:

$$W_{31} = -\frac{d}{2} \left( \frac{n^2(n^2 - 1)\sin\theta\cos\theta}{(n^2 - \sin^2\theta)^{\frac{5}{2}}} \right) NA^3$$

where d and n represent the thickness and refractive index of the disc, respectively. As understood from the above relationship, the coma aberration coefficient is proportional to the cube of the numerical aperture (NA). Therefore, considering that the NA of the objective lens required for a conventional compact disc (CD) is 0.45 and that for a conventional digital video disc or digital versatile disc (DVD) is 0.6 (to accommodate the higher information density), the DVD has a coma aberration coefficient of about 2.34 times that of the CD having the same thickness for a given tilt angle. Thus, the maximum tilt allowance of the DVD is reduced to about half that of the conventional CD. In order to conform the maximum tilt allowance of the DVD to that of the CD, the thickness d of the DVD could be reduced.

However, such a thickness-reduced disc adopting a shorter wavelength (high density) light source, e.g., a DVD, cannot be used in a recording/reproducing apparatus such as a disc drive for the conventional CDs adopting a longer wavelength light source because a disc having an non-standard thickness is influenced by a spherical aberration to a degree corresponding to the difference in disc thickness from that of a normal disc. If the spherical aberration is extremely increased, the spot formed on the disc cannot have the light intensity needed for recording information, which prevents the information from being recorded precisely. Also, during reproduction of the information, the signal-to-noise (S/N) ratio is too low to reproduce the recorded information exactly.

Therefore, an optical pickup adopting a light source having a short wavelength, e.g., 650 nm, which is compatible for discs having different thicknesses, such as a CD or a DVD, is necessary.

For this purpose, research into apparatuses capable of recording/reproducing information on either of two disc types having different thicknesses with a single optical pickup device and adopting a shorter wavelength light source is under progress. Lens devices adopting a combination of a hologram lens and a refractive lens have been proposed in, for example, Japanese Patent Laid-Open Publication No. Hei 7-98431.

FIGS. 1 and 2 show the focusing of zero-order and first-order-diffracted light onto discs 3a and 3b having different thicknesses, respectively. In each figure, a hologram lens 1, provided with a pattern 11, and a refractive objective lens 2 are provided along the light path in front of discs 3a and 3b. The pattern 11 diffracts a light beam 4 from a light source (not shown) passing through hologram lens 1, to thereby separate the passing light into first-order-diffracted light 41 and zero-order light 40 each of which is focused to a different point on the optical axis with a different intensity by the objective lens 2. The two different focal points are the appropriate focus points on the thicker disc 3b and the thinner disc 3a, respectively and thus enable data read/write operations with respect to discs having different thicknesses.

However, in using such a lens system, the separation of the light into two beams (i.e., the zero order and first order light) by the hologram lens 1 lowers the utilizing efficiency of the actually used (reflected and partially twice diffracted, 1st order) light to about 15%. Also, during the read operation, since the information is riding on one of the beams while the other beam is carrying no information, the beam that is carrying no information is likely to be detected as noise. Moreover, the fabrication of such a hologram lens requires a high-precision process used in etching a fine hologram pattern, which increases manufacturing costs.

FIG. 3 is a schematic diagram of another conventional optical pickup device as disclosed in U.S. Pat. No. 5,281,797. This optical pick-up device includes a variable diaphragm 1a for varying the aperture diameter, so that data can be recorded onto a longer wavelength disc as well as a shorter wavelength disc, but with the discs having the same thickness, and information can be reproduced therefrom. The variable diaphragm 1a is installed between the objective lens 2 and a collimating lens 5. The variable diaphragm 1a controls a beam 4 emitted from a light source 9 and transmitted through a beam splitter 6, by appropriately adjusting the area of the beam passing region, i.e., the numerical aperture (NA). The diametral aperture of the variable diaphragm 1a is adjusted in accordance with the spot size required by the disc to be used and always passes the annular beam 4a of the central region but selectively passes or blocks the beam 4b of the peripheral region. In FIG. 3, a reference numeral 7 denotes a focusing lens and a reference numeral 8 denotes a photodetector.

In the optical device having the above configuration, if the variable diaphragm is formed by a mechanical diaphragm, its structural resonance characteristics change depending on the effective aperture of the diaphragm. The installation of the diaphragm onto an actuator for driving the objective lens becomes difficult in practice. To solve this problem, liquid crystals may be used for forming the diaphragm. This, however, greatly impedes the miniaturization of the system, deteriorates heat-resistance and endurance and increases manufacturing costs.

Another approach is disclosed in U.S. Pat. No. 5,496,995. As disclosed, a phase plate in placed in a light path of an objective lens. The phase plate creates first and second light sources of different phases such that the amplitudes of the lateral sides of a main lobe of an image of the first light source are cancelled by the amplitude of the main lobe of an image of the second light source by superimposition. In one embodiment, annular opaque rings separate grooves of different depths, the grooves providing the phase difference. A problem inherent to this approach is the need to carefully control the groove depth and light amplitudes, for example, to create the proper phase change and lobe cancellation.

Alternatively, a separate objective lens for each disc may be provided so that a specific objective lens is used for a specific disc. In this case, however, since a driving apparatus is needed for changing lenses, the configuration becomes complex and the manufacturing cost increases accordingly.

SUMMARY OF THE INVENTION

It is an object of the present invention to provide a lens device which is inexpensive and easily fabricated, a method of obtaining a stable focus servo signal, an optical pickup adopting the same, a method of discriminating discs having different thicknesses and a method for reproducing/recording information from/onto the discs.

It is another object of the present invention to provide an objective lens whose light utilizing efficiency is enhanced and which can form aberration-reduced spots, a method of obtaining a stable focus servo signal, an optical pickup adopting the same and a method for reproducing/recording information from/onto the discs.

To accomplish the above objects, there is provided lens device including a lens focussing light into a focal zone and having a predetermined effective diameter; and light controlling means provided in a light path of the lens for preventing light in an intermediate axial region of the light path from reaching the focal zone, the intermediate axial region being located between a near axial region which includes a center of the light path and a far axial region located radially outward from the intermediate region, the light controlling means permitting light in the near and far regions of the light path to reach the focal zone.

Also, according to another aspect of the present invention, there is provided an optical pickup device comprising:
  a light source;
  an objective lens provided along a light path from the light source projecting light onto a disc, the objective lens focussing light into a focal zone and having a predetermined effective diameter; and
  light controlling means provided in the light path of the lens for preventing light in an intermediate axial region of the light path from reaching the focal zone, the intermediate axial region being located between a near axial region which includes a center of the light path and a far axial region located radially outward from the intermediate region, the light controlling means permitting light in the near and far regions of the light path to reach the focal zone.

Also, according to still another aspect of the present invention, there is provided a method for reproducing information from at least two discs having different thicknesses, comprising the steps of:
  providing an objective lens for focussing light in a light path into a focal zone;
  preventing light in an intermediate axial region of the light path from reaching the focal zone, the intermediate axial region being located between a near axial region which includes a center of the light path and a far axial region located radially outward from the intermediate region;
  permitting light in the near and far regions of the light path to reach the focal zone;
  placing one of the at least two discs having different thicknesses in the focal zone;
  converting light in the near and far axial regions which is reflected from the disc into electric signals in an inner photodetector and in a outer photodetector surrounding the inner photodetector;
  using electric signals corresponding to both near and far axial regions converted in both the inner and outer photodetector when the light is reflected from a relatively thin disc; and
  using electric signals corresponding to near axial region converted in only the inner photodetector when the light is reflected from a relatively thick disc.

Also, there is provided a method for recording information on at least two discs having different thicknesses, comprising the steps of:
  providing an objective lens for focussing light in a light path into a focal zone;
  placing one of the at least two discs having different thicknesses in the focal zone;
  preventing light in an intermediate axial region of the light path from reaching the focal zone, the intermediate axial region being located between a near axial region which includes a center of the light path and a far axial region located radially outward from the intermediate region; and
  permitting light in the near and far regions of the light path to reach the focal zone.

Further, there is provided a method for discriminating discs having different thicknesses, comprising the steps of:
  providing an objective lens for focussing light in a light path into a focal zone;
  preventing light in an intermediate axial region of the light path from reaching the focal zone, the intermediate axial region being located between a near axial region which includes a center of the light path and a far axial region located radially outward from the intermediate region;
  permitting light in the near and far regions of the light path to reach the focal zone;
  placing one of the at least two discs having different thicknesses in the focal zone;
  converting light in the near and far axial regions and reflected from the disc into electric signals using a quadrant photodetector;
  obtaining at least one of a sum signal and a focus error signal from the quadrant photodetector by increasing and decreasing focus current controlling an axial position of the objective lens a predetermined number of times;
  comparing the at least one of the sum signal and the focus error signal with a first reference value corresponding to a thin disc;
  determining that the disc is thin if the at least one of the sum signal and the focus error signal is greater than the first reference value;
  comparing the at least one of the sum signal and the focus error signal with a second reference value which is smaller than the first reference value only if the at least one of the sum signal and the focus error signal is smaller than the first reference value; and
  determining that the disc is thick if the at least one of the sum signal and the focus error signal is greater than the second reference value.

Additionally, there is provided a method for manufacturing a lens comprising the steps of:

provilding a first mold part having a lens surface pattern on an inside surface of the first mold part;

forming an intermediate axial region in the lens surface pattern, the intermediate axial region being located between a near axial region which includes a center of the lens and a far axial region located radially outward from the intermediate region, the intermediate axial region for preventing light incident onto the intermediate region of a molded lens from reaching a focal region of the molded lens;

providing a second mold part corresponding to the first mold part;

placing lens material between the first and second mold parts; and forming the lens having an intermediate portion between the first and second mold parts.

Also, there is provided a lens mold for forming a lens, the lens configured to focus light into a focal zone, the lens mold comprising:

a first mold part for forming one surface of the lens and having a lens surface pattern on an inside surface of the first mold part, the lens surface pattern including an intermediate axial region located between a near axial region which includes a center of the lens and a far axial region located radially outward from the intermediate region, the intermediate axial region including at least a surface irregularity of a predetermined pattern, the surface irregularity forming a light controlling means in the lens for permitting light in corresponding near and far regions of a light path, but not light in a corresponding intermediate region of the light path, to reach a focal zone of the lens; and a second mold part for forming an opposing surface of the lens.

BRIEF DESCRIPTION OF THE DRAWINGS

The above objects and advantages of the present invention will become more apparent from the following detailed description preferred embodiments thereof with reference to the attached drawings in which:

FIGS. 7B and 7C are enlarged views of the focal points shown in FIG. 7A for thin discs and thick discs, respectively;

DETAILED DESCRIPTION OF THE INVENTION

In the present invention, the light in an intermediate region around an axis in the center of a light travelling path is blocked or shielded. The intermediate region is located between a region near the axis ("near axial region") and a region farther from the axis ("far axial region"). Blocking the light in the intermediate region permits the light from the near and far axes regions to form a small light spot while minimizing side lobes around the light spot formed in a focal zone of the lens by suppressing interference of light otherwise present in the intermediate region.

Here, the near axis region represents the region around the central axis of the lens (i.e., the optical axis) having a substantially negligible aberration and focussing on a region adjacent to the paraxial focal point. The far axis region represents the region which is relatively farther from the optical axis than the near axis region and forms a focus region adjacent to the marginal focus. The intermediate region is the region between the near axis region and the far axis region.

Alternately, a near axis region and a far axis region can be defined by the optical aberration amount in a thick disc. An objective lens must have very small amount of optical aberration (e.g., spherical aberration, coma, distortion, etc.). Generally, an objective lens should have average aberration below around $0.04\lambda$ (where $\lambda$ denotes the wavelength of light transmitted to the lens) in order to use in an optical pickup device. An objective lens having optical aberration greater than $0.07\lambda$ is considered as unacceptable for use in an optical pickup device. As the thickness of the disc increases, the optical aberration increases. Thus, if the objective lens having optical aberration below $0.04\lambda$ is used for a pre-defined or thin disc (e.g., DVD), it produces a large amount of optical aberration (mainly spherical aberration) for a thicker disc (e.g., CD).

Figure 5:
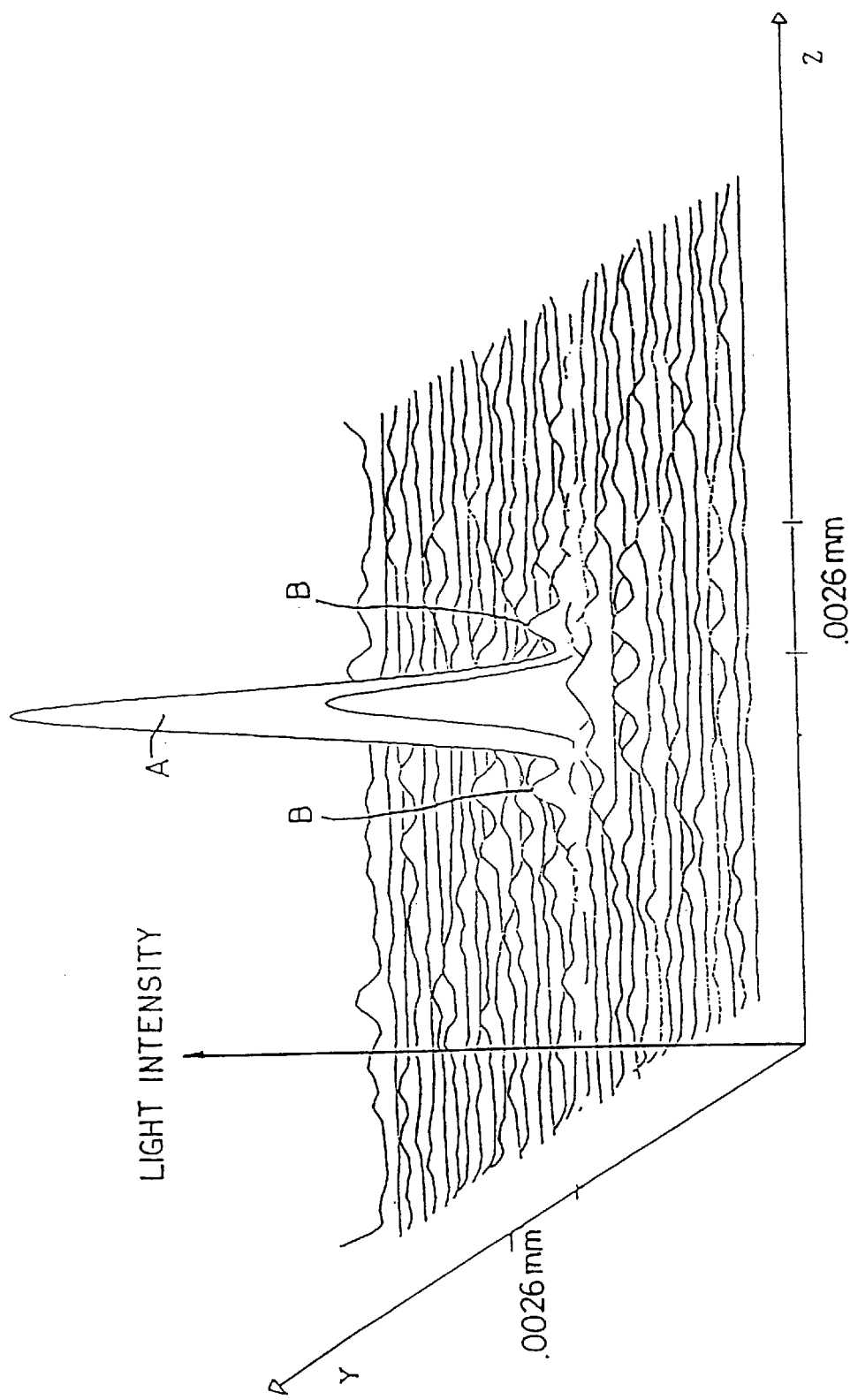

Furthermore, the unwanted peripheral light (B) shown in FIG. 5 occurs where the optical aberration is between $0.04\lambda$ and $0.07\lambda$. In order to compensate the large optical aberration in a thick disc, the near axis region is defined where the optical aberration is below $0.04\lambda$. And, the far axis region is defined where the optical aberration is greater than $0.07\lambda$. Thus, the intermediate region is defined between $0.04\lambda$ and $0.07\lambda$ to suppress the interference occurred by the spherical aberration. More explanation of FIG. 5 is provided below.

To this end, in the intermediate region between the near axis and the far axis regions along the incident light path, there is provided light controlling means of an annular shape or a polygonal shape such as a square shape for blocking or scattering light. This invention utilizes the fact that the light of the far axis region does not affect the central light portion of the light spot but the light of the intermediate region between the near axis and the far axis does.

Figure 1:
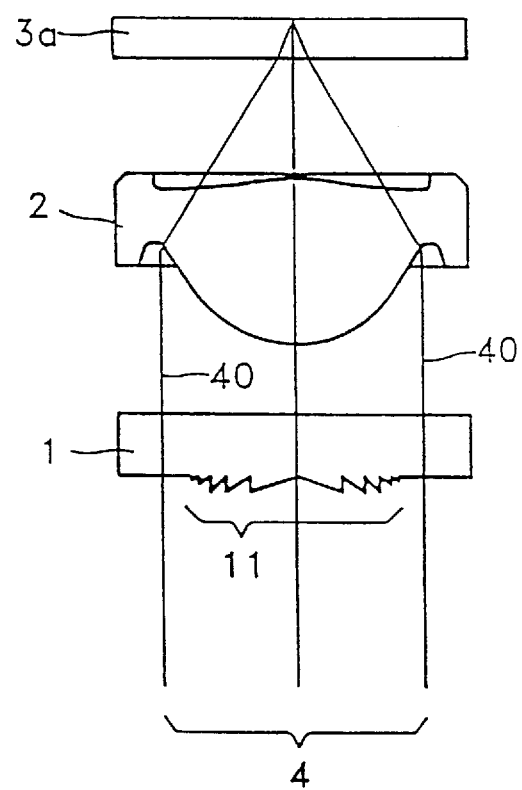
FIGS. 1 and 2 are schematic diagrams of a conventional optical pickup device having a hologram lens, showing the states where a light beam is focused onto a thin disc and a thick disc, respectively.
Figure 2:
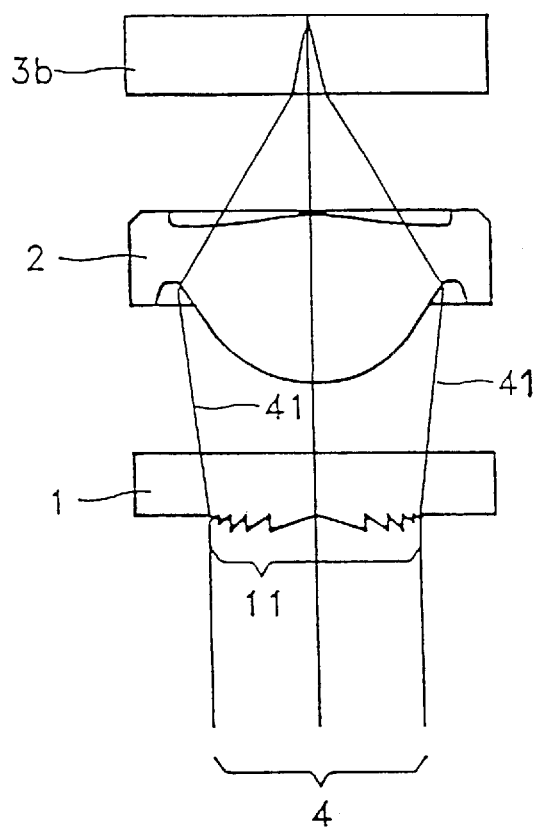
Figure 3:
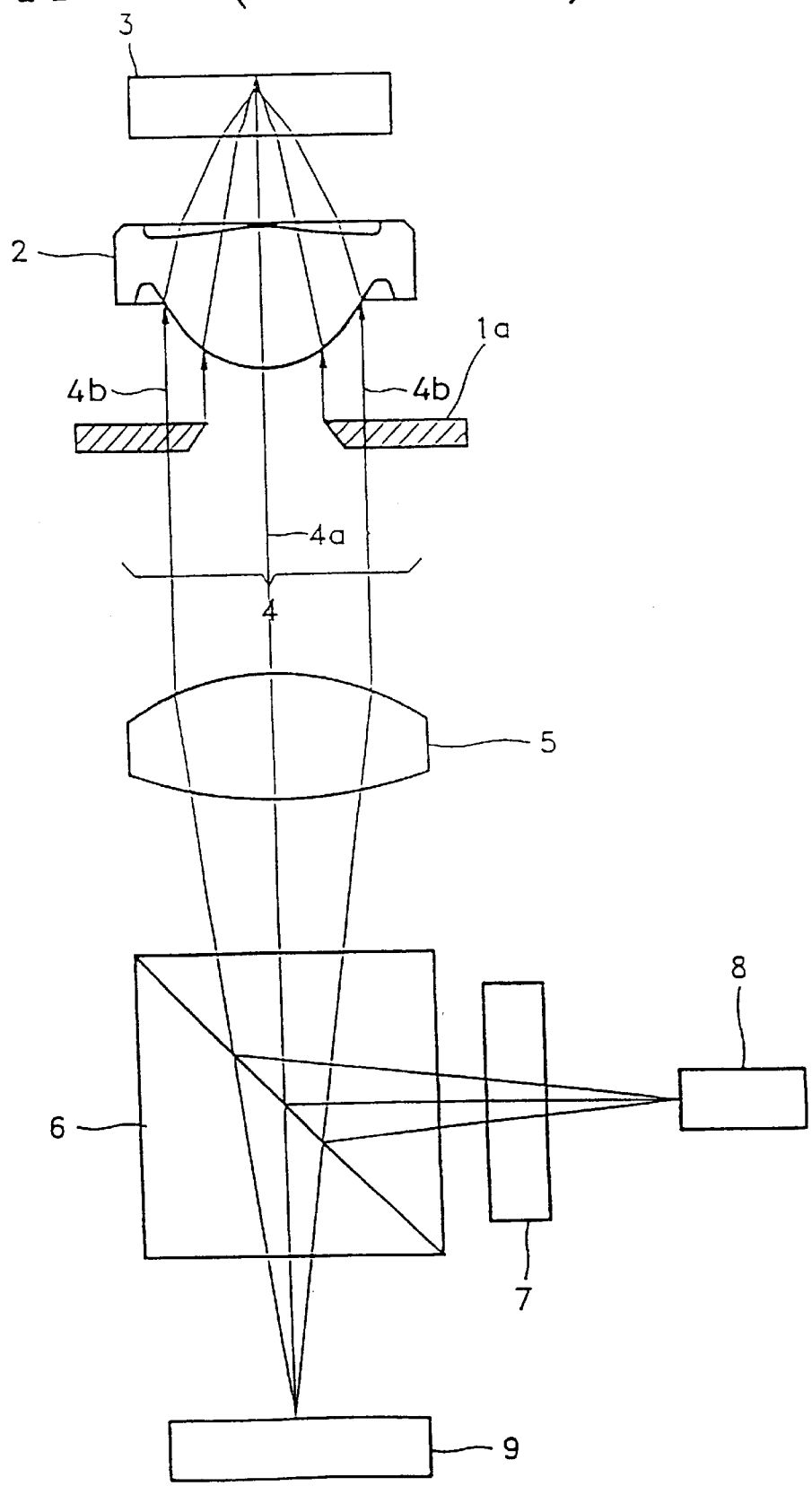
FIG. 3 is a schematic diagram of another conventional optical pickup device.
Figure 4:
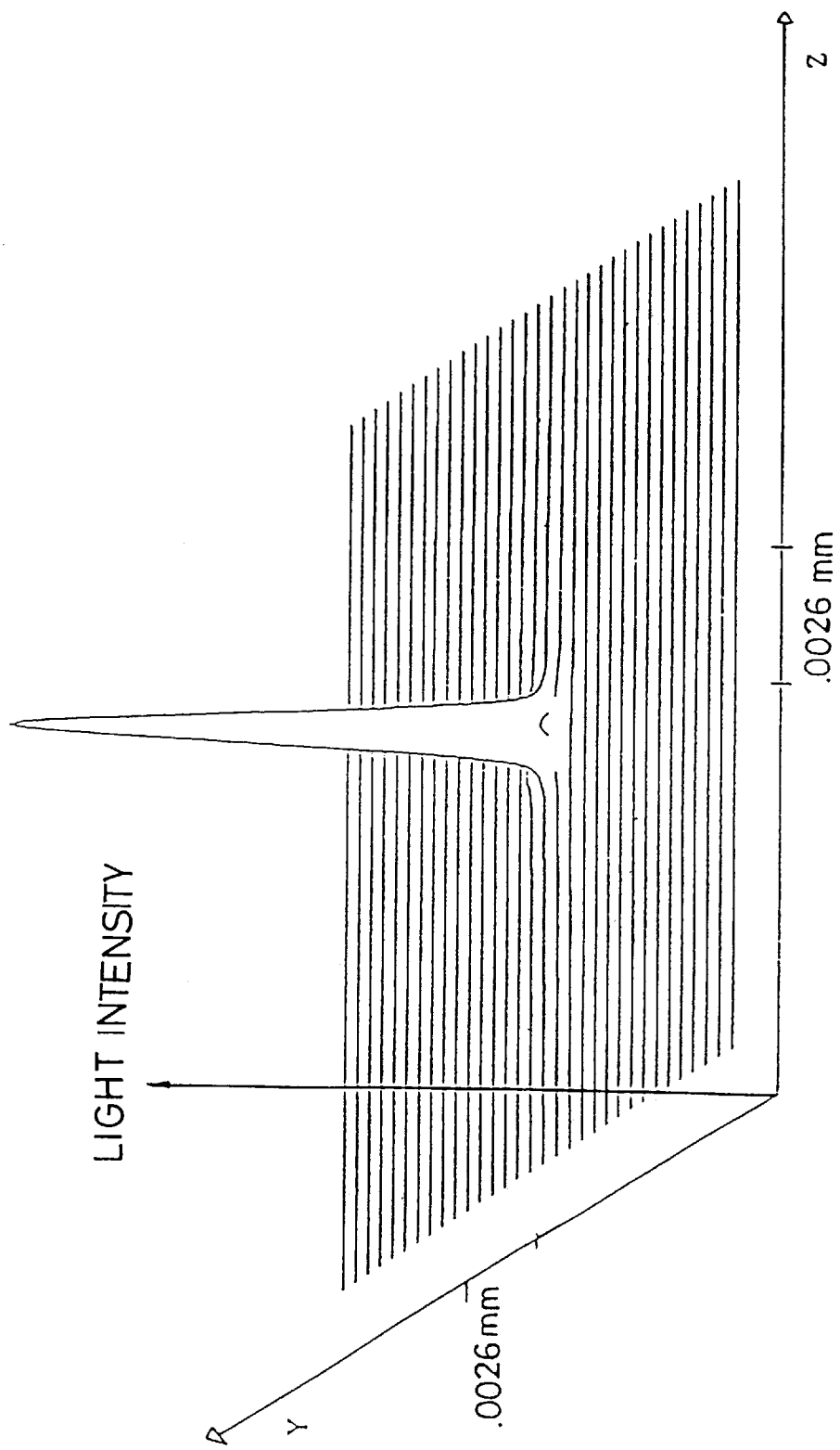
FIGS. 4 and 5 show the states where a light beam is being focused onto a thin disc and a thick disc, respectively, by a common objective lens without using a hologram lens.

FIG. 4 shows a state where a light having a wavelength of 650 nm is focused onto a disc having a thickness of 0.6±0.1 mm and a refractive index of 1.5 by an objective lens having a refractive index of 1.505. As shown, the light spot has a diameter of 0.85 $\mu$m at a point of $1/e^2$ (~13% of the light intensity).

FIG. 5 shows a state where a light is focused onto a disc having a thickness of 1.2±0.1 mm under the same conditions as above. Referring to FIG. 5, the light the spot, which has a diameter 2 $\mu$m, is relatively focused in a central part (A) but is also focused in other parts (B). At this time, the light intensity of the other parts (B) is 5~10% that of the central part (A). This is because the light which is incident onto a region far from an optical axis is affected by spherical aberration, the degree of which depends on different disc thicknesses.

As described above, the light spot formed on a thick disc is larger than that formed on a thin disc, which is due to the spherical aberration. Also, since the light incident onto a far axis region, i.e., a region relatively far from the optical axis, is focused onto an area different (surrounding) from the optical axis and is scattered, the light of the far axis region does not affect the focusing of the light spot of the central part (A). However, as described above, since the light present between the near axis and the far axis interferes with the focusing of the light of the near axis, the amount of the peripheral light (B) of the focused light becomes greater. In other words, the light in the intermediate region between the near axis region and the far axis region experiences interference when the present invention is not employed, so that peripheral light beams (B) are generated around the central light beam (A), as shown in FIG. 5. Such peripheral light beams generally have about 6~7% intensity of the central light beam, thereby increasing jitter during light detection and thus making accurate data recording and reproduction difficult.

Figure 6A:
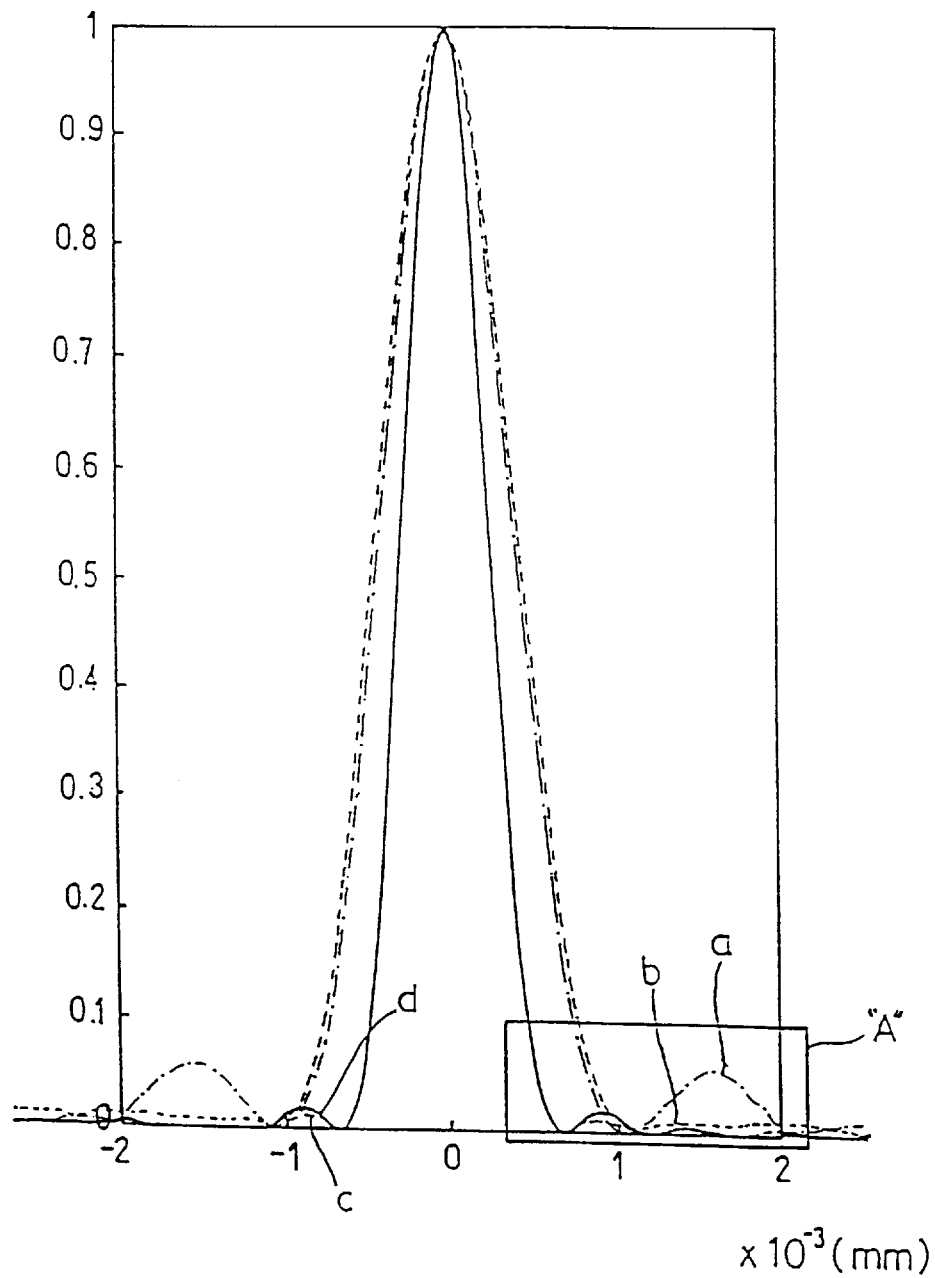
FIG. 6A is a graph showing the change in spot sizes in cases when an objective lens according to the present invention is adopted and is not adopted.
Figure 6B:
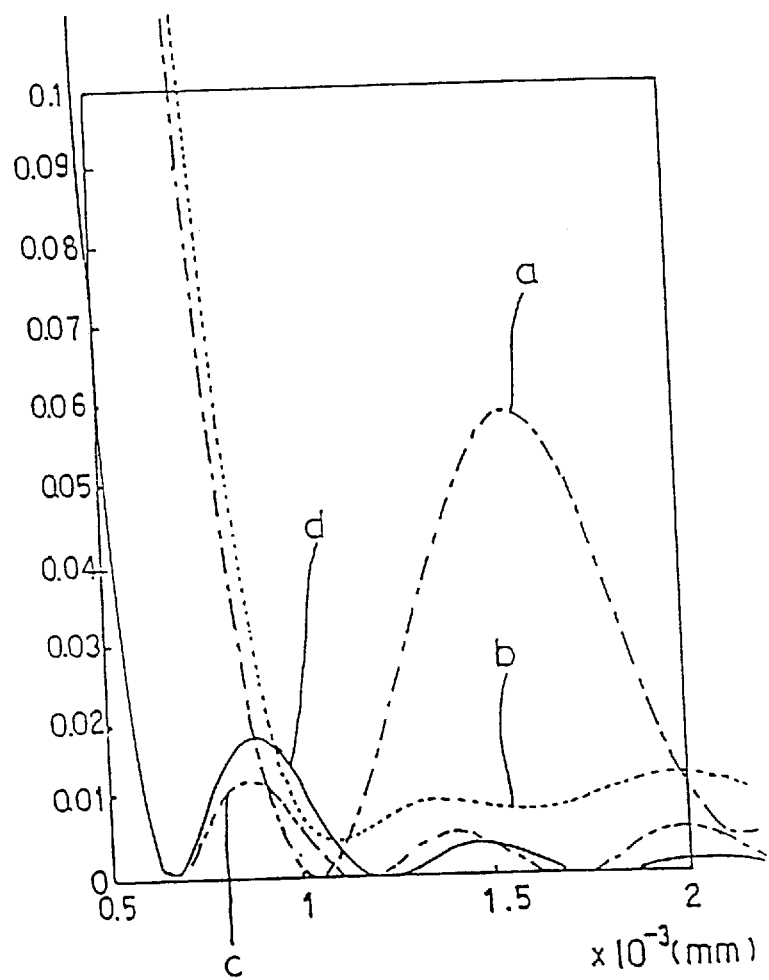
FIG. 6B is an enlarged view of a part "A" shown in FIG. 6A.

FIG. 6A shows graphs (a) through (d) illustrating the change in the light spot sizes in cases when the light controlling means according to the present invention is adopted and is not adopted. In FIG. 6A, graphs (b) and (c) are obtained when the light controlling means is adopted and graphs (a) and (d) are obtained when the light controlling means is not adopted. At this time, an objective lens having a numerical aperture of 0.6 and an effective radius of 2 mm is used. As an example of the light controlling means for blocking or scattering the light, an annular shaped light controlling film having a central height of 1.4 mm from the optical axis and a width of 0.25 mm is adopted.

Under the above conditions, graphs (c) and (d) are curves showing the change in light spot sizes in case of adopting a 0.6 mm disc and graphs (a) and (b) are ones in case of adopting a 1.2 mm disc. Here, graphs (b) and (c) show the spot state present when the present invention is adopted.

It is understood that the difference in spot size at central portion "A" of FIG. 5 is within 3% depending on the presence or absence of the light controlling film in a case of adopting a 0.6 mm disc. However, the size of a portion "B" shown in FIG. 5 is noticeably reduced by using the light controlling film in the case of adopting a 1.2 mm disc.

Therefore, as described above, according to the present invention, the light passing through the intermediate region between the near axis and the far axis regions is controlled. For this purpose, there is provided along the light path a light controlling means for controlling (e.g., blocking, scattering, diffracting, absorbing or refracting) the light in the intermediate region, thereby suppressing an increase in the size of the peripheral light of the light spot and reducing the spherical aberration which would otherwise occur.

Figure 7A:
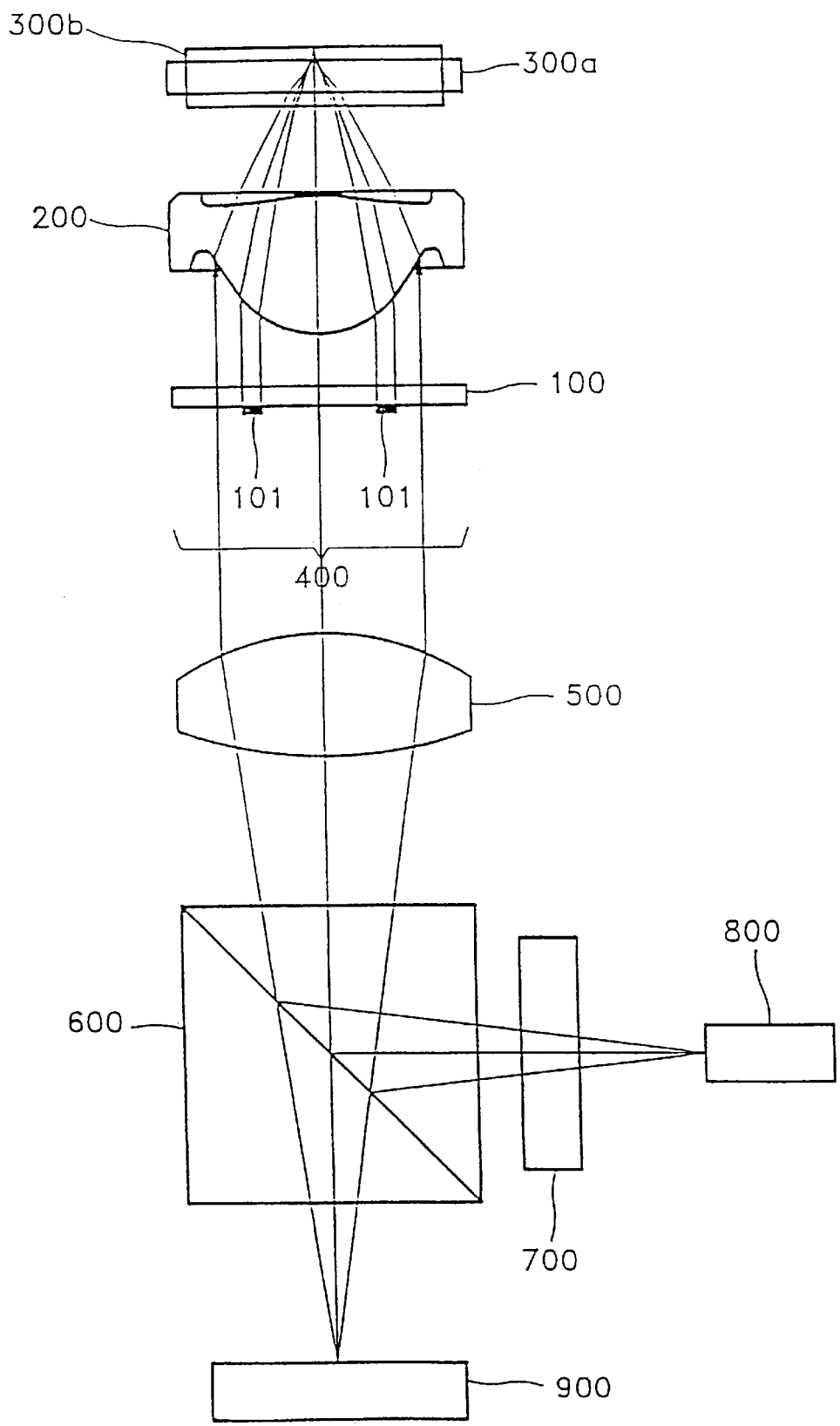
FIG. 7A is a schematic diagram of an optical pickup according to the present invention showing the states where a light beam is being focused onto two discs of different thicknesses.

FIG. 7A is a schematic diagram of an optical pickup device adopting the objective lens device according to a first embodiment of the present invention, where the light focused states with respect to thin and thick discs are compared. FIGS. 7B and 7C are enlarged views of the focal points shown in FIG. 7A for thin discs and thick discs, respectively. As shown in FIGS. 7B and 7C, the objective lens 200 is moved to focus the light on either thin or thick disc.

Figure 8:
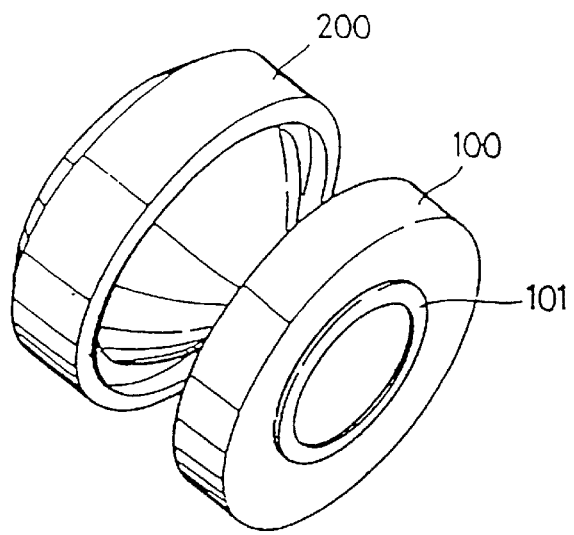
FIG. 8 is a perspective view of an objective lens of the optical pickup shown in FIG. 7A, according to the present invention.

FIG. 8 is a perspective view of an objective lens 200 and a light controlling member 100 as light controlling means.

In FIG. 7A, a reference numeral 300*a* represents a comparatively thin information recording medium, e.g., 0.6 mm thick disc, and a reference numeral 300*b* represents a comparatively thick disc, e.g., 1.2 mm thick disc. It should be noted that the diameter of thin and thick discs can be same. Also, the bottom surfaces of the discs can be located in either a different plane or in the same plane depending on the disc holder mechanism (not shown) for supporting and rotating the discs 300*a* and 300*b* during operation. The drawing has been modified to show the difference in the thickness. The laser light passes through an aperture in the disc holder, as is conventional.

Figure 9:
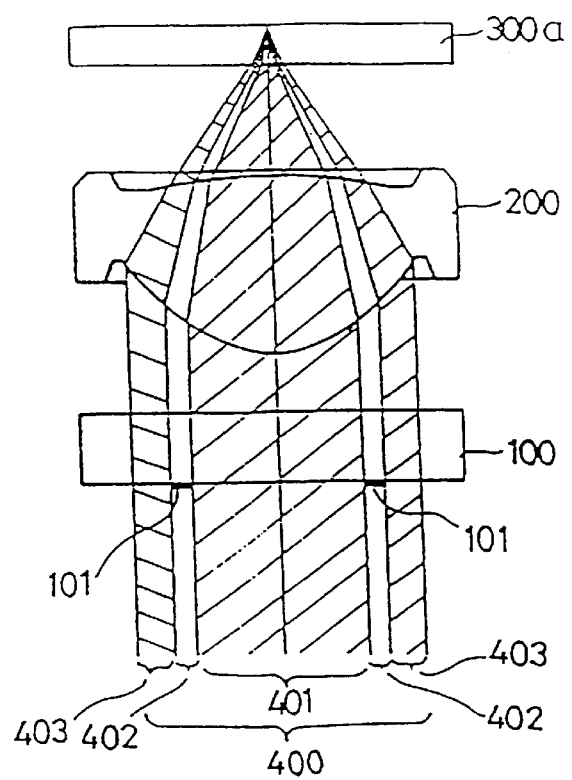
FIG. 9 is a schematic diagram of an objective lens according to an embodiment of the present invention adopted for the optical pickup shown in FIG. 7A, showing a state where a light beam is being focused onto a disc.

A general objective lens 200 is positioned in front of disc 300*a* or 300*b*. The objective lens 200 having a predetermined effective diameter focuses an incident light 400 from a light source 900 and receives the light reflected from disc 300*a* or 300*b*. As shown in FIG. 9, there is provided a light controlling member 100 in the rear of the objective lens 200, which is a feature of the present invention. The light controlling member 100 is transparent and has a light controlling film 101 of an annular shape for suppressing, such as blocking or scattering, the incident light on its surface. The outer diameter of light controlling film 101 is smaller than the effective diameter of objective lens 200. The light controlling member is made of glass or plastic. Cr, $CrO_2$ or Ni, for example, can be used as the light controlling film 101. Alternatively or additionally, any of the surface irregularities discussed below with reference to FIGS. 12–17 could be used on the light controlling member.

A collimating lens 500 and a beam splitter 600 are provided between light controlling member 100 and light source 900, as shown in FIG. 7A. A focusing lens 700 and a photodetector 800 are provided along the travelling path of the light reflected from beam splitter 600. Here, the photodetector 800 is basically a quadrant structure.

In the optical pickup device having the aforementioned configuration according to the present invention, the light controlling film 101 suppresses among the incident light beams 400, the light beam 402 of the intermediate region passing through the region between the near axis and the far axis regions, thereby transmitting only the light beams 401 and 403 passing through the near and far axes regions, as shown in FIG. 9. For example, a light controlling film 101 made of Chromium (Cr) would block the light beam 402 from passing through the light controlling member 100. Moreover, the light beam 402 can be scattered, reflected, diffracted or refracted depending on the surface roughness of the light controlling film 101.

Figure 10A:
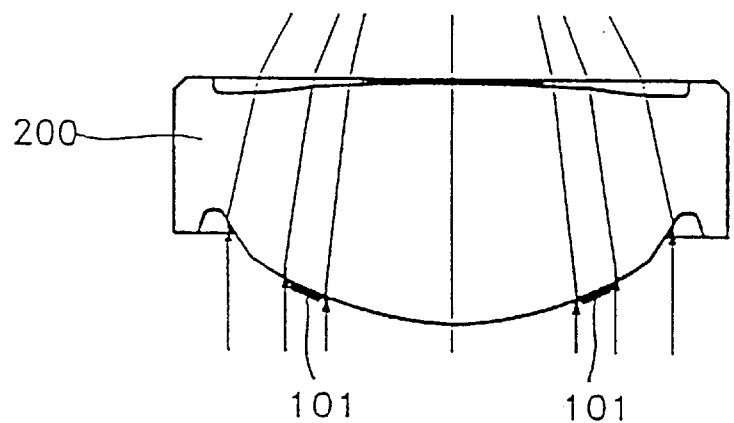
FIG. 10A is a section view of an objective lens having a light controlling film on the surface thereof, according to another embodiment of the present invention.
Figure 10B:
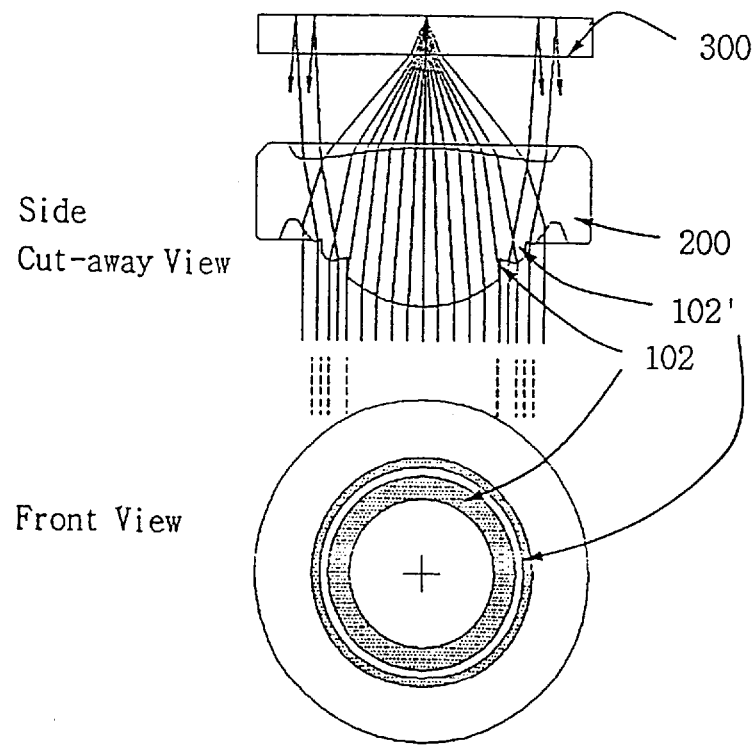
FIG. 10B is a section view of an objective lens according to still another embodiment of the present invention.
Figure 11:
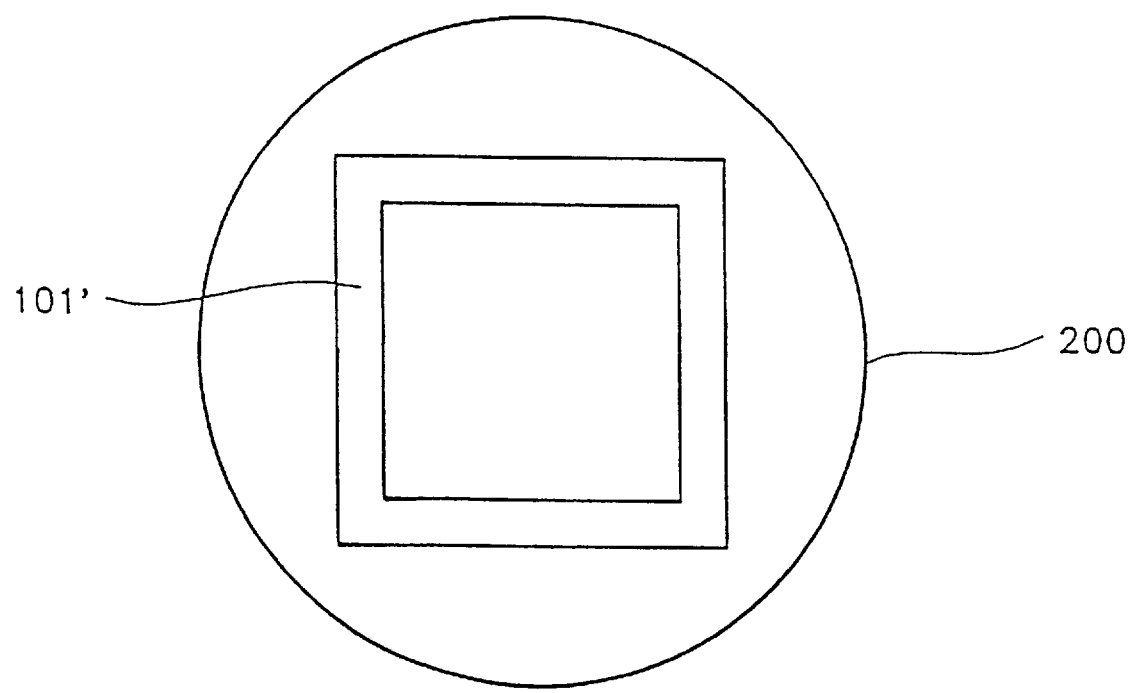
FIG. 11 is a plan view of an objective lens having a square light control groove, according to another embodiment of the present invention.
Figure 16:
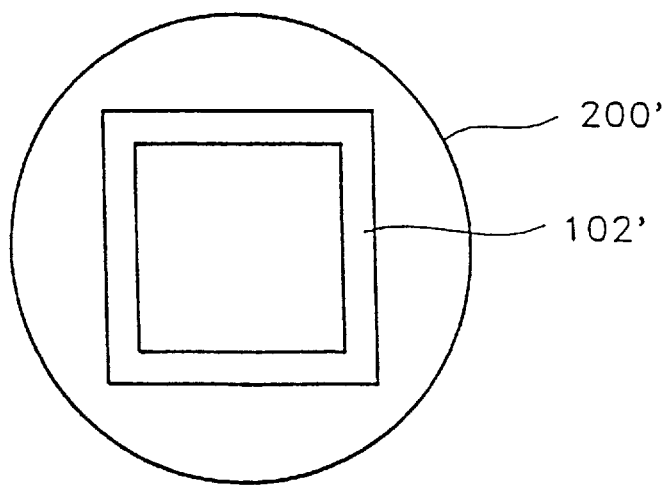
FIG. 16 is a plan view of an objective lens according to still another embodiment of the present invention.

The light controlling film 101 having the above-described function is directly coated on one surface of objective lens 200, as shown in FIG. 10. As shown in FIG. 11, the light controlling film 101' may be modified in its shape to have a polygonal shape such as a square shape or a pentagonal shape as shown in FIG. 16, rather than a circular shape. Moreover, an additional light controlling film 101 or 101' can be provided to define the near axis region depending on the thickness of a disc. For example, the objective lens is optimized to a thin disc and a corresponding near axis region should be defined. Therefore, additional light controlling film or groove can be provided to define an appropriate intermediate region for the thin disc according to its thickness. In FIG. 10B, an additional annular light controlling groove 102' is added in order to optimized a disc having a thickness of 0.9 mm. Thus, the objective lens 200 can be used for discs having thicknesses of 0.6 mm, 0.9 mm, or 1.2 mm, for example.

Figure 12A:
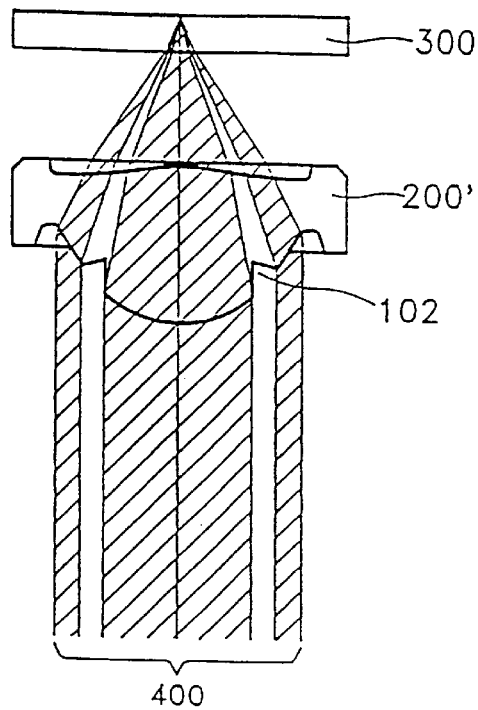
FIG. 12A is a schematic diagram of an objective lens according to another embodiment of the present invention, showing a state where a light is being focused onto a disc.
Figure 12B:
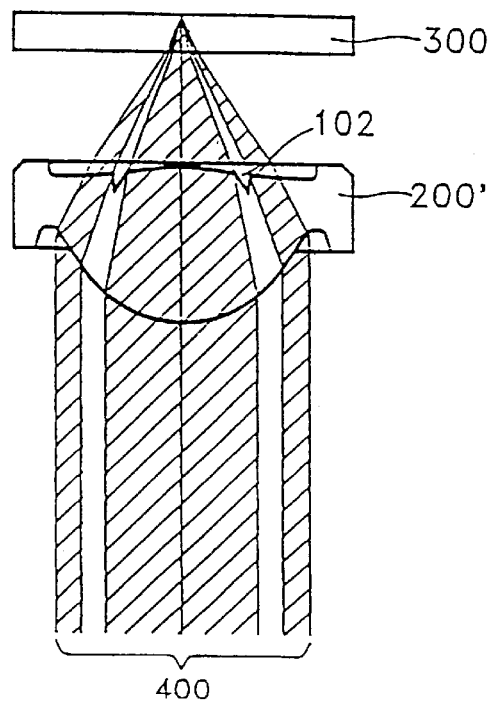
FIG. 12B is a cross-sectional view of an objective lens according to still another embodiment of the present invention.
Figure 13:
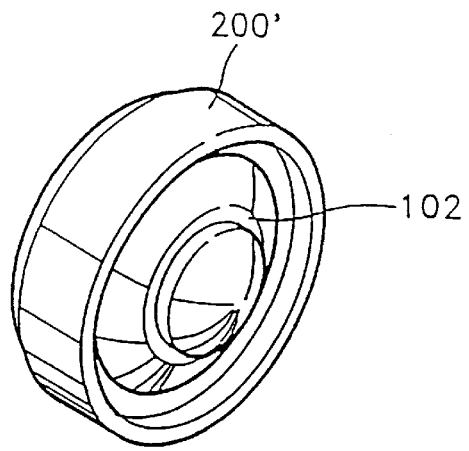
FIG. 13 is a perspective view of the objective lens shown in FIG. 12A.
Figure 14A:
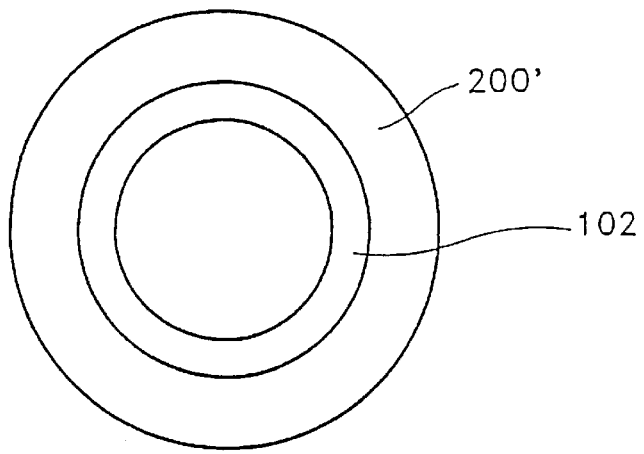
FIGS. 14A and 14B are a plan view and a partially enlarged view, respectively, of the objective lens shown in FIG. 12A.

FIGS. 12A and 12B illustrate an objective lens according to a still another embodiment of the present invention. FIGS. 13 and 14A are a perspective view and a front view of the objective lens shown in FIG. 12A, respectively. In these embodiments, there is provided a light deflecting means 102 as the light controlling means in objective lens 200'. In other words, a structural pattern, i.e., a light controlling groove 102 of an annular shape, for partially blocking, diffracting, refracting, or scattering the incident light, is provided in the initial light receiving side (FIG. 12A), or on the light emitting side (FIG. 12B) of the objective lens 200'. Moreover, the grooves 102 can be provided in both sides of the objective lens 200'. Alternatively, the light deflecting means 102 can take the form of a projection or wedge-shaped rib 102 as shown in FIG. 15K, for instance. The wedge-shaped rib 102 can also be placed on either side, or both sides, of the objective lens 200'. The outer diameter of light controlling groove or light controlling wedge-shaped rib 102 is smaller than the effective diameter of objective lens 200'.

Like the aforementioned light controlling film 101, the light controlling groove or wedge-shaped rib 102 is provided in the light region between the near axis and the far axis and functions to redirect (e.g., reflect, refract or scatter) the incident light in a direction irrelevant to the light focusing or suppress (e.g., block) the incident light.

The objective lens 200' can be manufactured by a general high-pressure injection molding method (not shown) or a compression molding method, as shown in FIGS. 15H through 15K, using a mold having a pattern corresponding to the wedge-shaped rib 102.

Figure 15A:
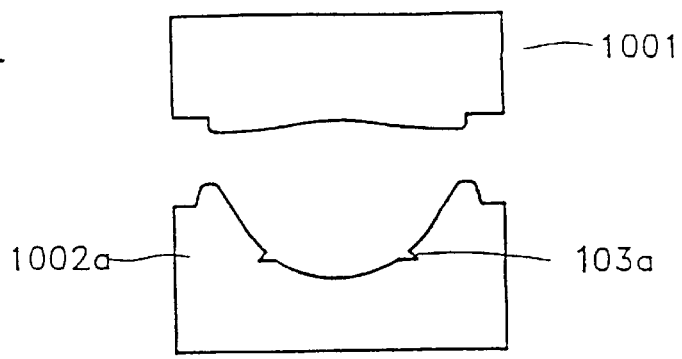
FIG. 15A is a side view of a mold for manufacturing an objective lens according to an embodiment of the present invention.
Figure 15B:
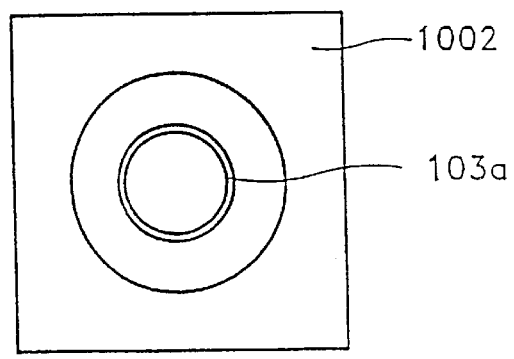
FIG. 15B is a plan view showing the inside of the lower frame of the mold shown in FIG. 15A.
Figure 15C:
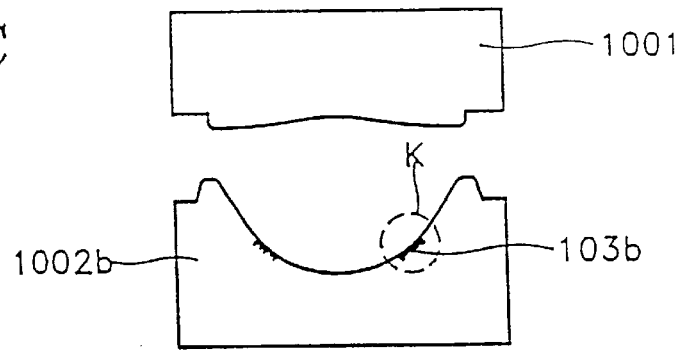
FIG. 15C is a side view of a mold for manufacturing an objective lens according to another embodiment of the present invention.
Figure 15D:
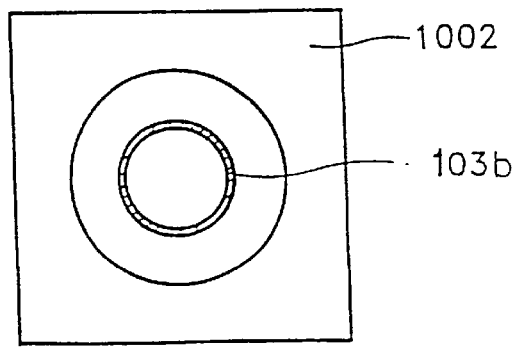
FIG. 15D is a plan view showing the inside of the lower frame of the mold shown in FIG. 15C, FIGS. 15E through 15G are enlarged view of a portion K shown in FIG. 15C, illustrating various embodiments of the present invention.

The lower mold 1002*a* has a pattern having one or multiple grooves 103*a* formed in correspondence with the light controlling rib 102 for dispersing the light in the intermediate region, as shown in FIGS. 15A and 15B, so that the fabricated lens is provided with a stepped or wedge-shaped light controlling means protruding on the surface of the lens, but was receded as a groove in the description of FIG. 12A above or a light controlling means having a diffraction lattice. The groove 103*a* is formed at the intermediate region between the near axis region and the far axis region. Also, the light controlling means 102 may in the alternative be engraved, etched or scratched on the surface of the lens. As shown in FIGS. 15C and 15D, an uneven surface formed by an erosion or etching treatment in the portion K comprises the light controlling means 102 of the lens according to another embodiment of the present invention.

Figure 15E:
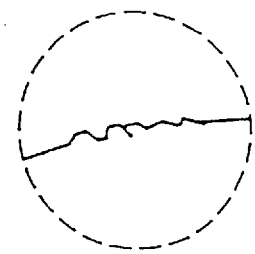
FIG. 15H and 15I show a manufacturing process of an objective lens according to the present invention.
FIG. 15J is a side view of the objective lens manufactured by the processes shown in FIGS. 15H and 15I.
FIG. 15K is a side view of the objective lens.
Figure 15F:
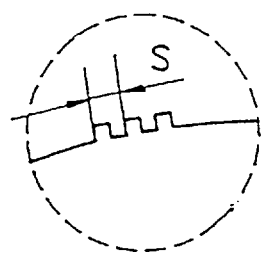
Figure 15G:
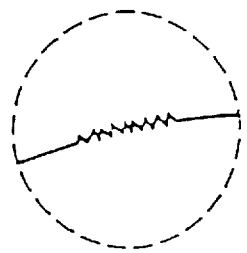

FIGS. 15E through 15G illustrate various examples of the uneven surfaces (rough, toothed, jagged surfaces) for forming the light controlling means 102, which may be composed of just one form of surface unevenness or combination of types.

In FIG. 15F, the light controlling means 102 may have an evenly-stepped shape forming grating pattern to diffract the incident light in the intermediate region. The grating pattern has a pitch S which is less than approximately 200 µm for a laser wavelength of 650 nm.

Figure 15H:
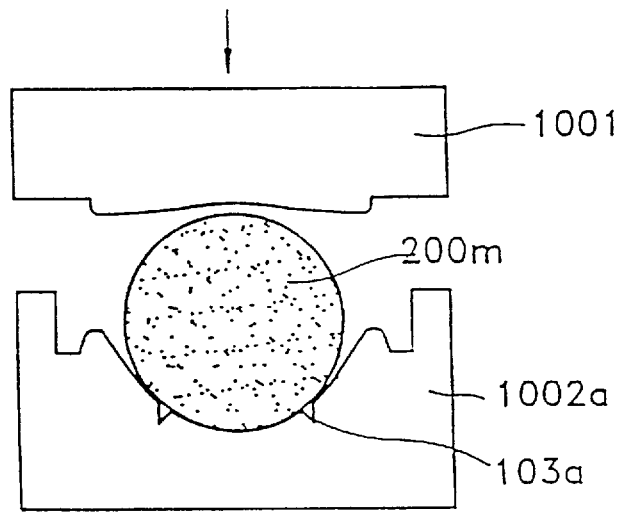
Figure 15I:
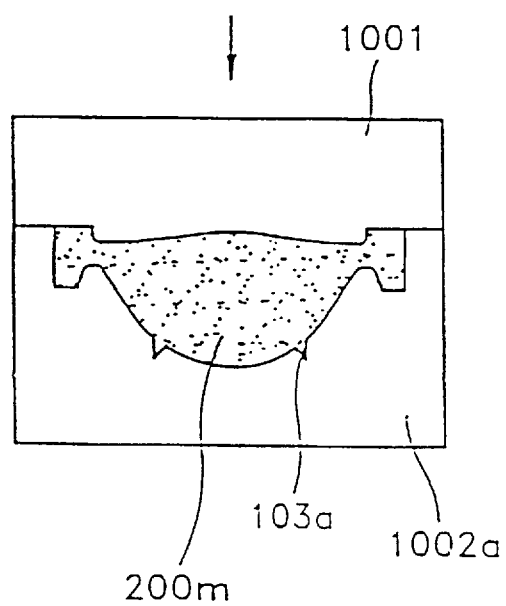
Figure 15J:
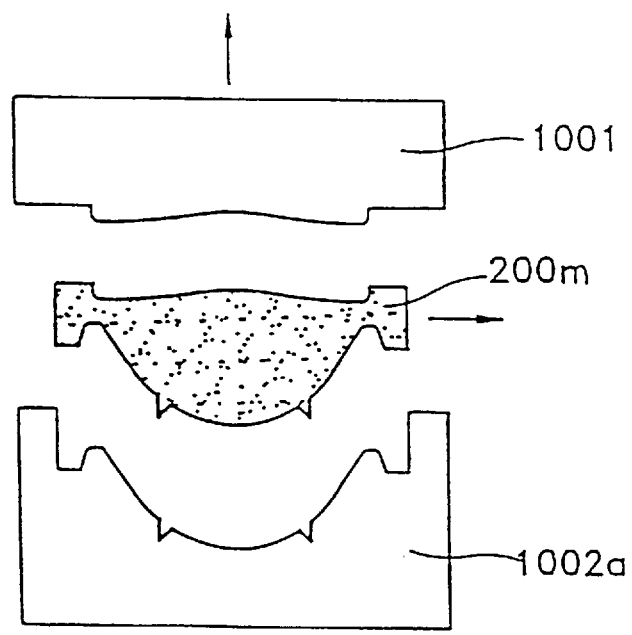
Figure 15K:
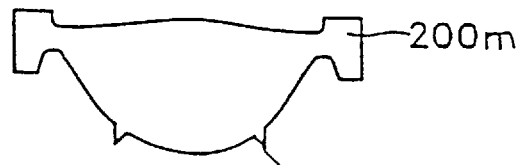

FIG. 15H shows a lens material 200m such as glass or plastic is interposed between the upper mold 1001 and the lower mold 1002a. As shown in FIG. 15I, the upper mold 1001 and the lower mold 1002a are brought close to each other to compressively mold the lens material 200m. Then, as shown in FIG. 15J, the upper mold 1001 and the lower mold 1002a are separated and the objective lens 200m is obtained.

Figure 14B:
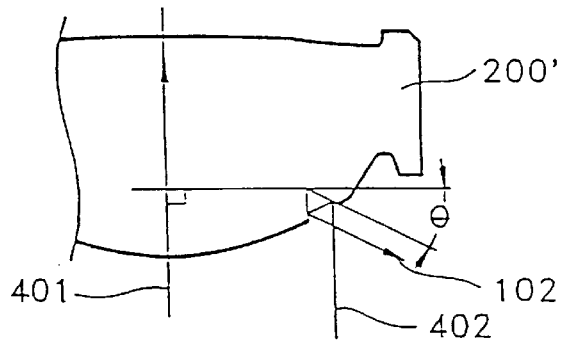

The light controlling groove 102 is preferably formed for the bottom surface of the objective lens 200' to be oriented by a predetermined angle θ with respect to a perpendicular of the optical axis, as shown in FIG. 14B. The light of the intermediate region, reflected from light controlling groove 102, is preferably scattered or reflected in a direction not parallel to the optical axis.

FIG. 16 is a front view of an objective lens having a light controlling groove as a light controlling means, where a light controlling groove 102' of a square shape is formed in objective lens 200' according to still another embodiment of the present invention.

Light controlling groove 102' can be formed of a polygonal shape such as a square shape. Moreover, the objective lens can be modified to have more than one light controlling groove to control the incident light. It is also possible to use any of these surface irregularities (e.g., groove, rib, toothed, rough and jagged) on a separate transparent member such as the light controlling members 100.

Figure 17:
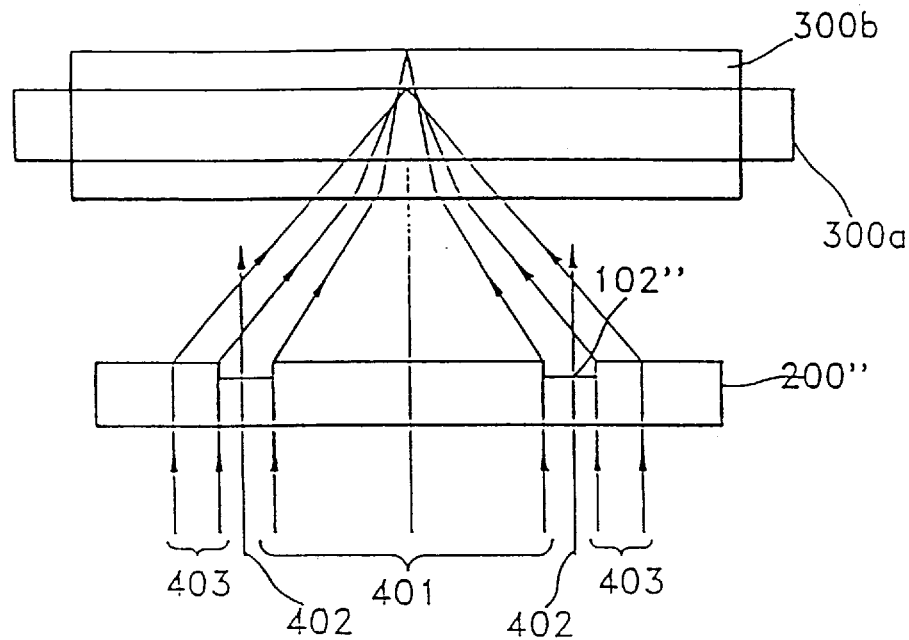
FIGS. 17 and 18 are schematic diagrams of an objective lens according to still yet another embodiment of the present invention, showing states where a light beam is being focused by a plane lens onto two discs of different thicknesses, respectively.
Figure 18:
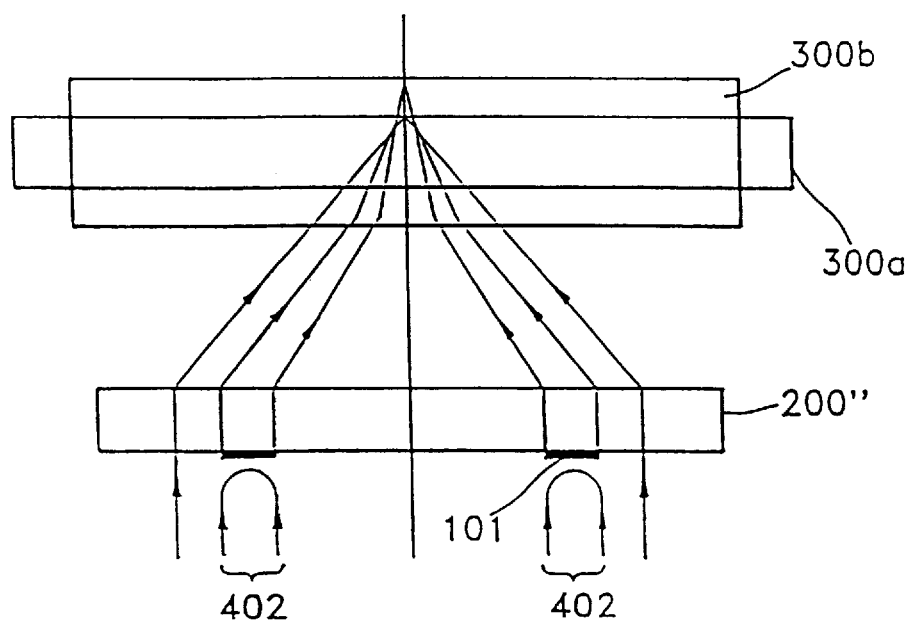

In the above embodiments, a convex lens was used as the objective lens 200 or 200', which might be replaced by a planar lens using a diffraction theory, such as a hologram lens or a Fresnel lens. Specifically, when the lens is provided with light controlling means, an annular or square light controlling groove 102" is formed in a plane lens, as shown in FIG. 17, or a separately fabricated light controlling film 101 having an annular or square shape is fixed or coated, as shown in FIG. 18. Light controlling groove 102" transmits the light 402 of the intermediate region without diffraction. Otherwise, light controlling groove 102" reflects light in the intermediate region in a direction irrelevant to the light focusing. Thus, the light 402 of the intermediate region is prevented from reaching the light spot of a disc.

A light controlling film 101 shown in FIG. 18 absorbs, scatters and/or reflects the light 402 of the intermediate region, which is incident onto plane lens 200", prevents the light 402 of the intermediate region from reaching the light spot of a disc. For example, when a dark color paint is used as a light controlling film, the film absorbs the light. Also, the light controlling groove or the light controlling film shown in FIGS. 17 and 18 can be modified to have more than one annular groove or film depending on the thickness of a disc.

It should be noted that the lens device structure described above is not limited to an objective lens used in an optical pickup device.

Figure 19:
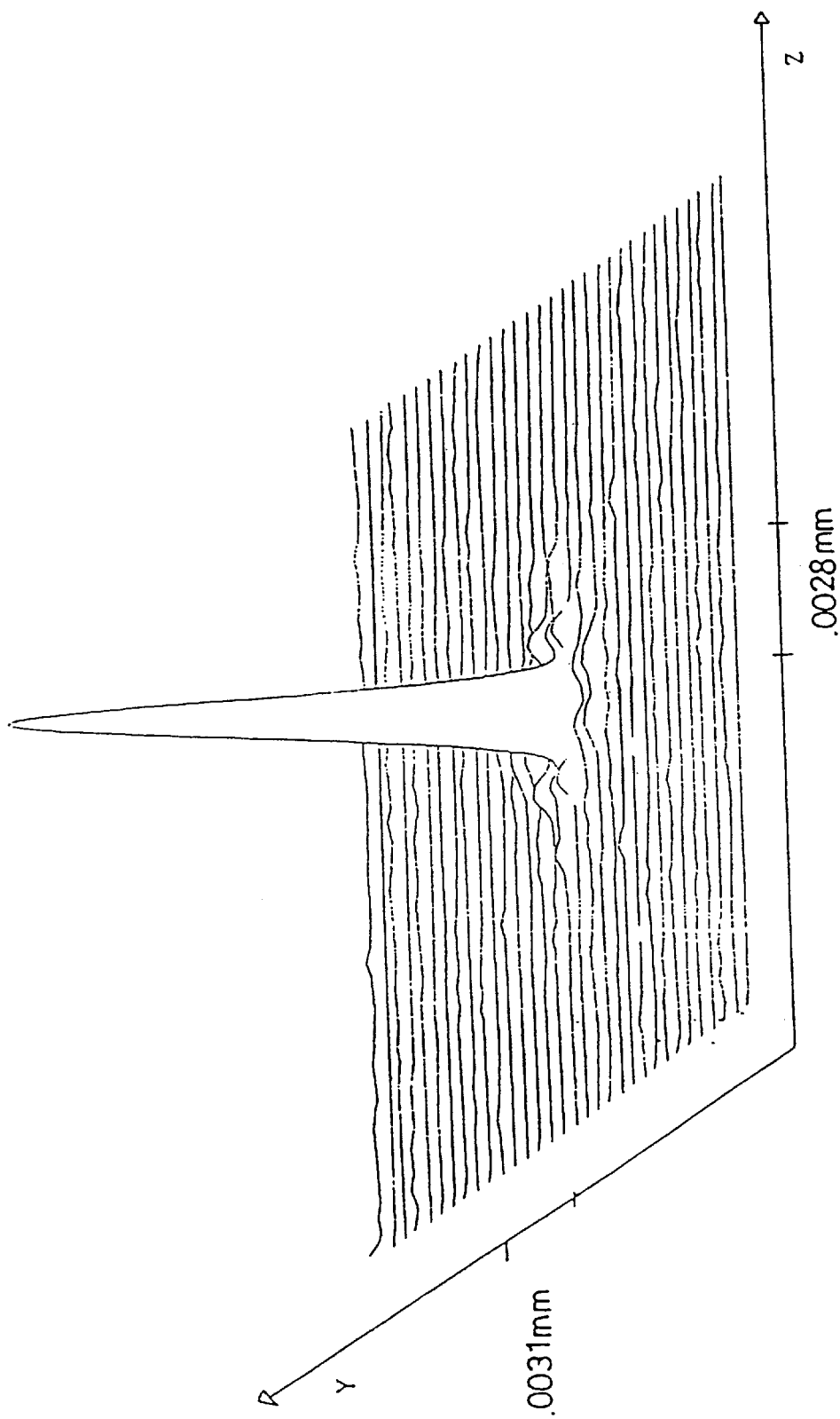
FIGS. 19 and 20 are three-dimensional plots showing the states where the light is focused onto a thick disc and a thin disc, respectively, by the lens device according to the present invention.

FIG. 19 shows the size of the light spot on a 1.2 mm thick disc, as obtained by the above embodiments. The objective lens adopted herein has an effective diameter of 4 mm, a diameter of the near axis region of 2 mm and that of the far axis region from 2.4 mm to 4.0 mm. Thus, the light controlling means blocks the light beams ranging from 2.0 mm to 2.4 mm in diameter. The inner diameter of light controlling means having annular shape can be changed to be in the range of 2.0 to 3.0 mm to optimize the focusing spot in the disc. Also, the inner diameter and the width of the light controlling means can also be between 1.1 to 1.4 mm (such as 1.2 mm) and between 0.1 and 0.25 mm (such as 0.15 mm), respectively. Other ranges are possible depending on system considerations.

In the light spot formed under the above conditions, as the result of the measurement, the diameter of the light spot at a point of $1/e^2$ (~13%) of the central light intensity was 1.3 µm. Compared to the device shown in FIG. 5, which does not adopt a light controlling film, the light amount of the portion "B" shown in FIG. 5 is reduced by more than 70% in the case of the device according to the present invention, which adopts a light controlling film.

Figure 20:
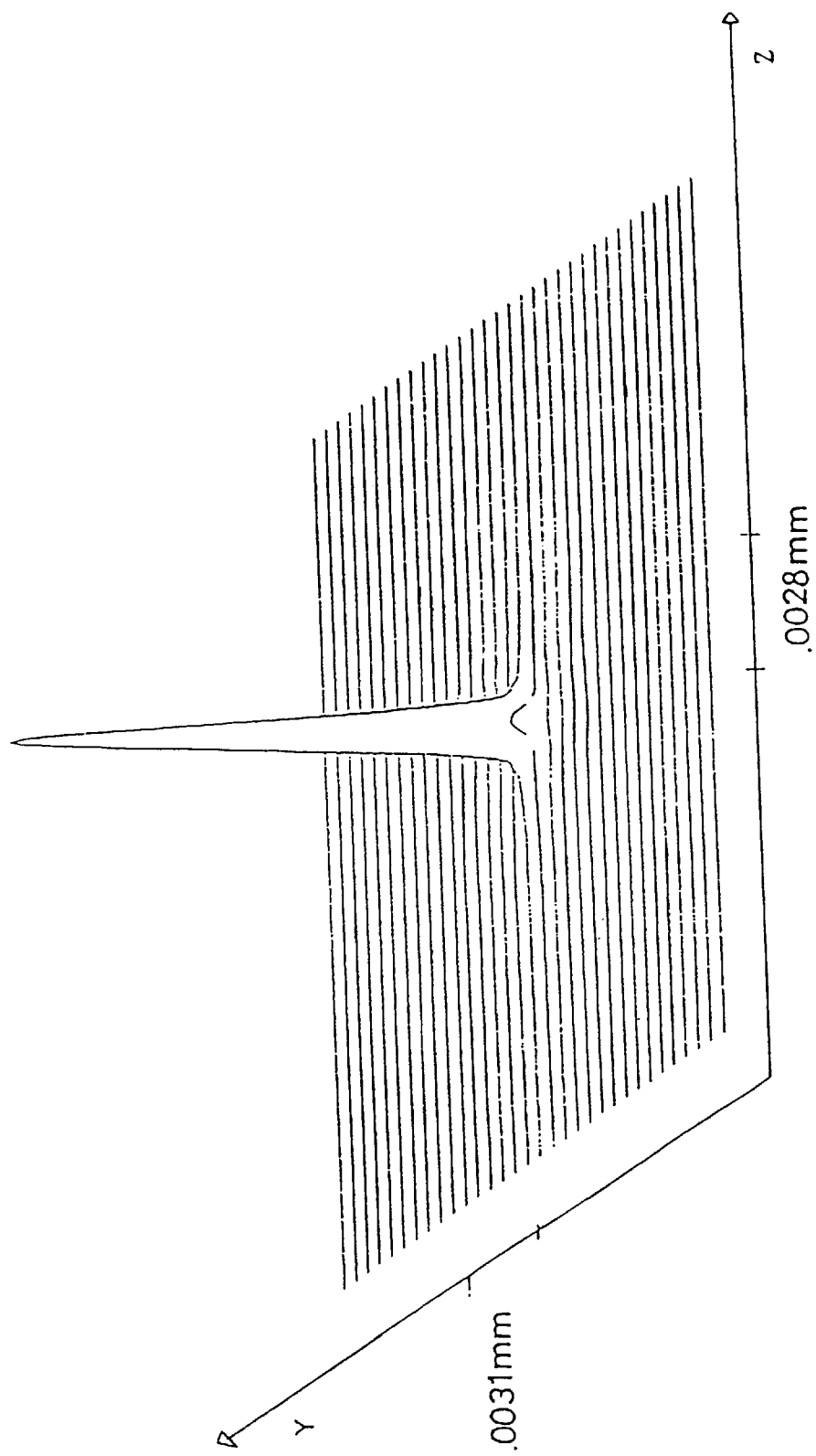

FIG. 20 shows the size of the light spot on a comparatively thin disc, i.e., a 0.6 mm disc, under the above-described conditions. According to the measurement, the diameter of the light spot at a point of $1/e^2$ (~13%) of the central light intensity was 0.83 µm.

As described above, according to the present invention, a light spot can be formed on a disc at an optimal state. As shown in FIG. 7A, the light reflected from disc is transmitted through the objective lens 200, the light controlling member 100 and the collimating lens 500 and is reflected from the beam splitter 600 to then be transmitted through the focusing lens 700 to reach the photodetector 800 where it is detected and converted to an electric signal. The photodetector 800 is for obtaining a focus error signal by astigmatic aberration and is a generally a quadrant detector.

Hereinbelow, the characteristics of the photodetector 800 in the optical pickup device according to the present invention will be described in detail.

Figure 21:
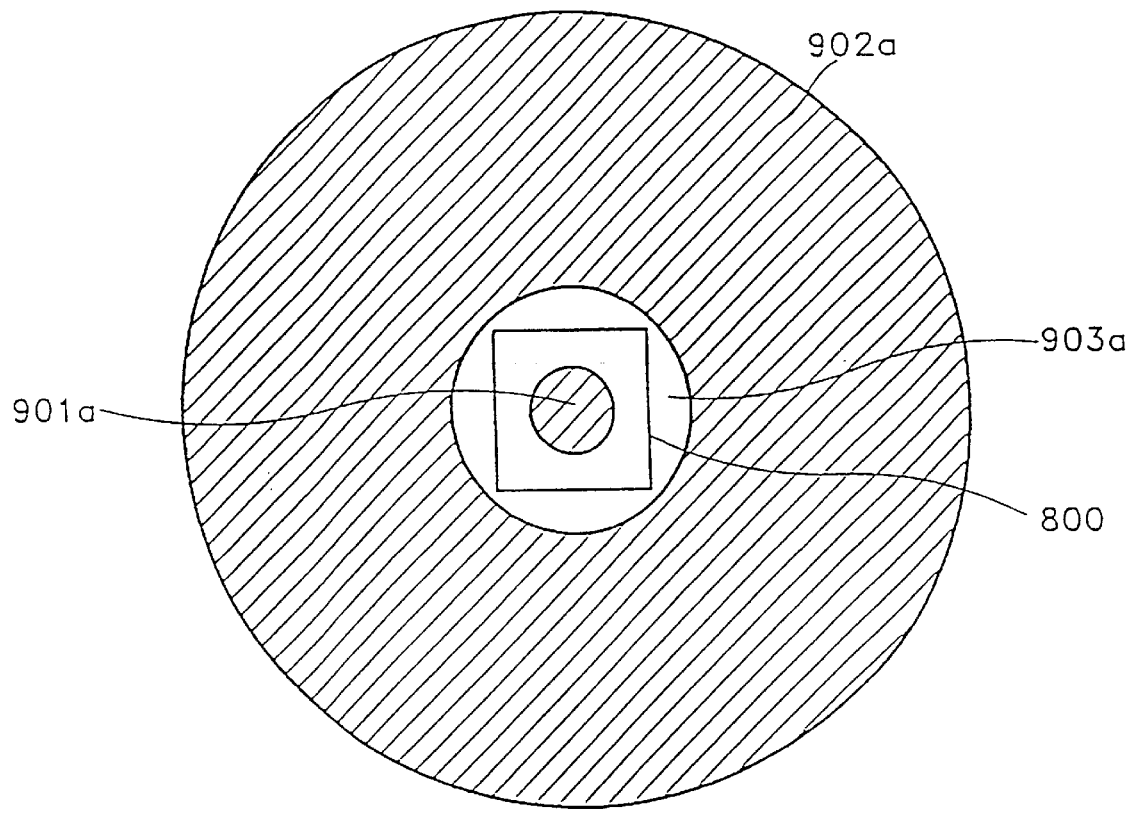
FIGS. 21 and 22 are plan views of each photodetector in the case of using a thick disc and a thin disc in the optical pickup according to the present invention, showing the states where light is incident to the photodetector from a 1.2 mm disc and from a 0.6 mm disc, respectively.
Figure 22:
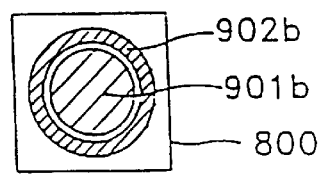

As shown in FIGS. 21 and 22, a spot formed in the center of the photodetector 800 has central regions 901a and 901b corresponding to the light of the near axis region and peripheral regions 902a and 902b corresponding to the light of the far axis region. The "a" and "b" designations signify a light spot on a thick disc and on a thin disc, respectively. Specifically, FIG. 21 shows the case of a comparatively thick disc, e.g., a 1.2 mm disc, and FIG. 22 shows the case of a comparatively thin disc, e.g., a 0.6 mm disc. The change in diameters is insignificant in the central region 901a by the light of the near axis region, irrespective of the disc thickness. However, the change in diameters is significant in the intermediate region 903a, in which the light is blocked by the light controlling member 100.

First, referring to FIG. 21, the central region 901a corresponding to the near axis region is in the center of the photodetector 800 and the peripheral region 902a surrounds the photodetector 800. The intermediate region 903a between the central region 901a and the peripheral region 902a is the portion from which the light is eliminated by a light controlling member. Since the peripheral region 902a and the intermediate region 903a are substantially enlarged by spherical aberration in this example where the reflective surface of the disc is near the paraxial focus, only the light of the near axis is used in reproducing information from a 1.2 mm thick disc.

Referring to FIG. 22, both the central (i.e., near axis) region 901b and the peripheral (i.e., far axis) region 902b are formed on the detection surface of the photodetector 800 because, in this example, the reflective surface of the thin disc is near the minimum circle of the beam focus. In other words, all of the light of the near and far axes regions are used in reproducing information from a thin (0.6 mm) disc, excluding the light of the intermediate region which is eliminated by a light controlling member. Here, the diameter of the near axis region 901b, being paraxial, maintains a relatively constant value irrespective of a disc type.

As described above, in order to read information from discs having different thicknesses, the optical pickup device according to the present invention adopts a photodetector 800 devised so as to receive only the light of the near axis region in reading information from a thick disc and receive the light of the near and far axes regions in reading information from a thin disc. Therefore, when a thick disc is used, a signal corresponding to the light of the near axis region is obtained. When a thin disc is used, a relatively higher intensity signal, corresponding to the light of the near and far axes regions, is obtained.

Figure 23:
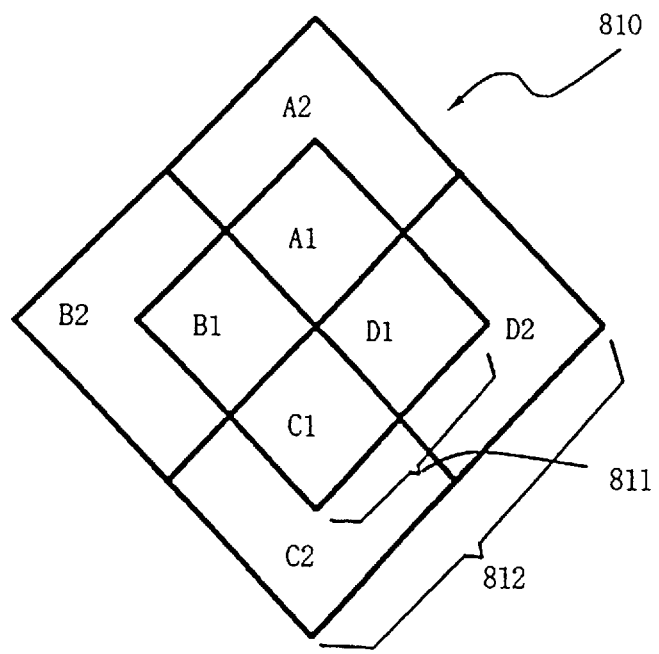
FIG. 23 is a plan view of an eight-segment photodetector adopted for the optical pickup according to the present invention.

FIG. 23 shows another type of photodetector 810, which has an octahedron or eight-segment structure wherein a second detection region 812 is provided around a first detection region 811 which is centrally located and equivalent to the quadrant photodetector shown in FIG. 21. Here, first detection region 811 consists of four square first-light-receiving elements A1, B1, C1 and D1, and second detection region 812 consists of four L-shaped second-light-receiving elements A2, B2, C2 and D2.

Figure 30:
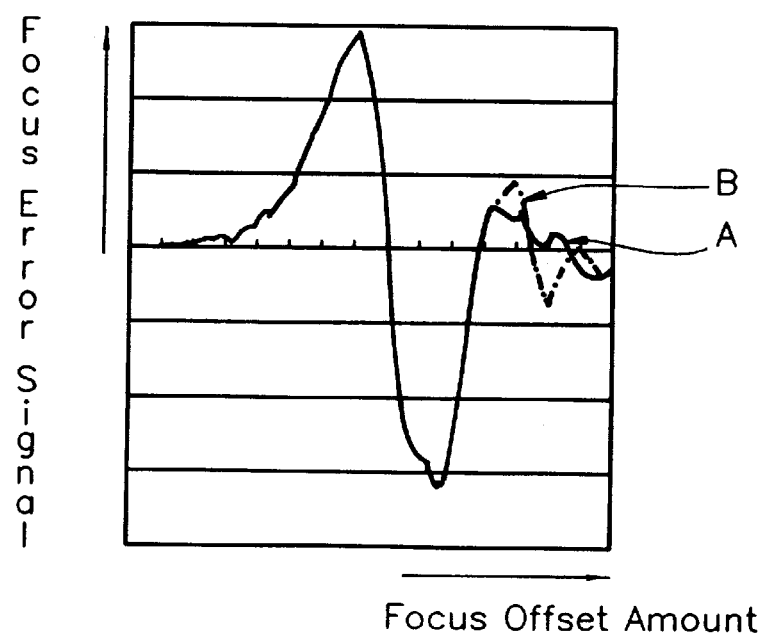
FIG. 30 shows the focus signals obtained from the eight-segment photodetector shown in FIG. 23.

A focus error signal obtained by using the octahedron photodetector 810 is shown in FIG. 30, when information is read from a thick disc. Here, the signal from the first light receiving region 811 only is indicated by a solid line A and that received from both the first and second light receiving regions 811 and 812 is indicated by a dotted line B.

FIGS. 24–26, and 27–29 show the light receiving states of the photodetector, when a thin disc (digital video disc) is used, and when a thick disc (compact disc) is used, respectively.

Figure 24:
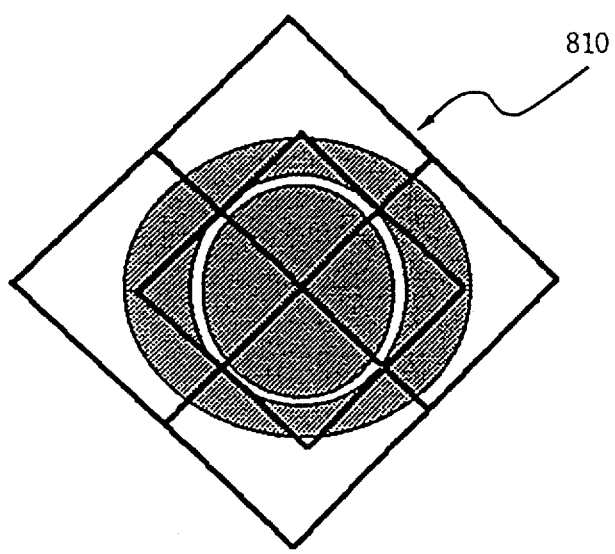
FIGS. 24–26 and 27–29 are plan views showing the light receiving region formed on the eight-segment photodetector, by an objective lens position relative to a thin disc and a thick disc, respectively.
Figure 27:
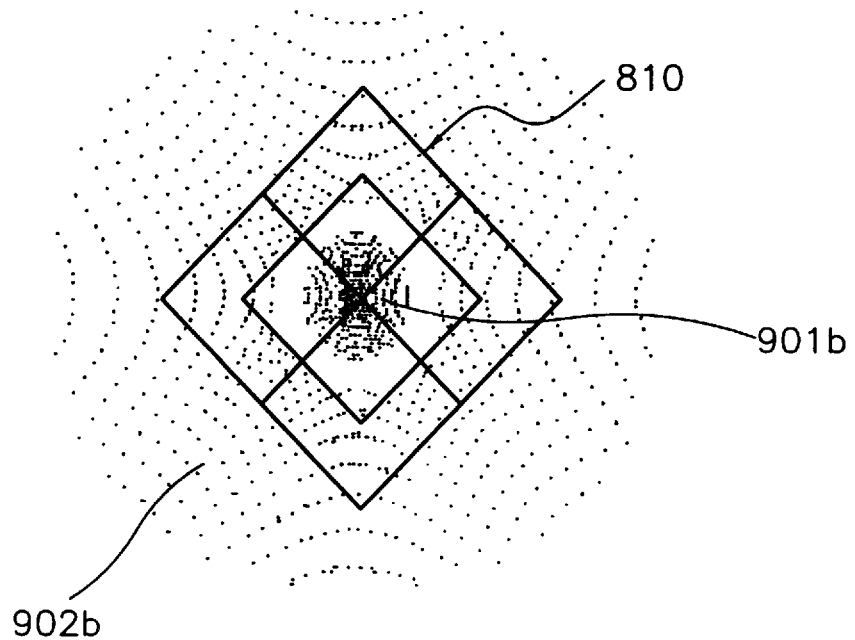

The first detection region 811 has dimensions such that the size of the first region 811 should be optimized to receive the light from the near axis region without loss when information is read from a thick disc, and not to receive the light from the far axis region. Additionally, the first and second detection regions 811 and 812 have dimensions such that the light beams of the near axis and far axis regions are all received when information is read from a thin disc, as shown in FIG. 24. When information is read from a thick disc, the light of the far axis region impinges on the second light receiving region 812, as shown in FIG. 27.

Figure 25:
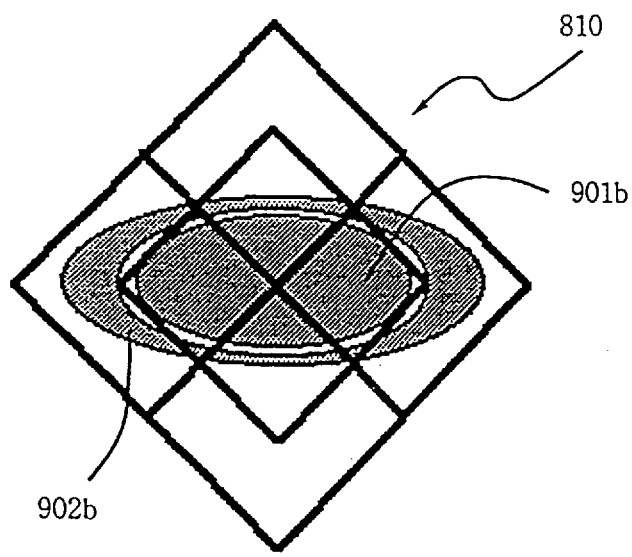
Figure 26:
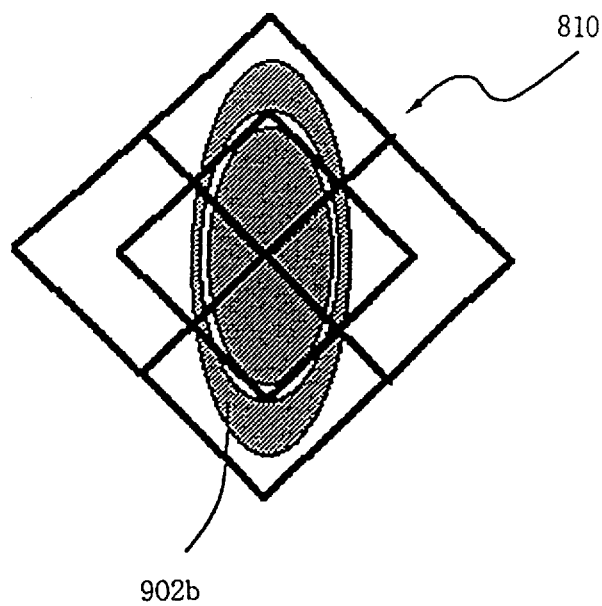
Figure 28:
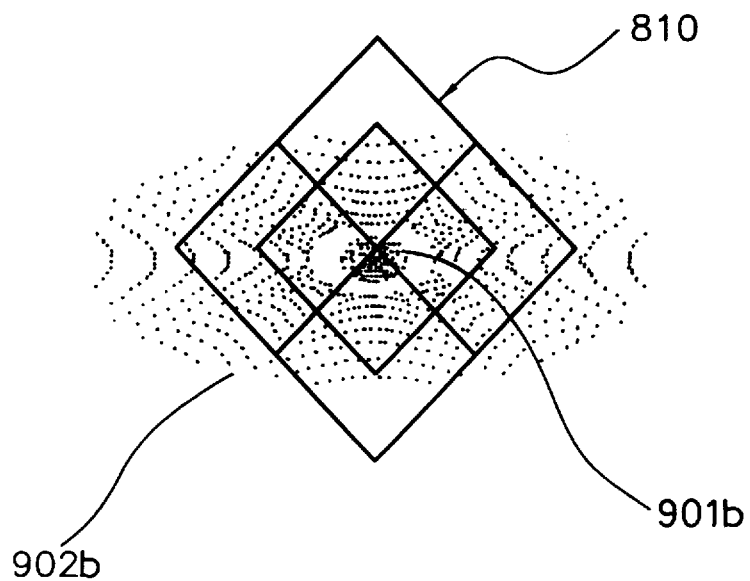
Figure 29:
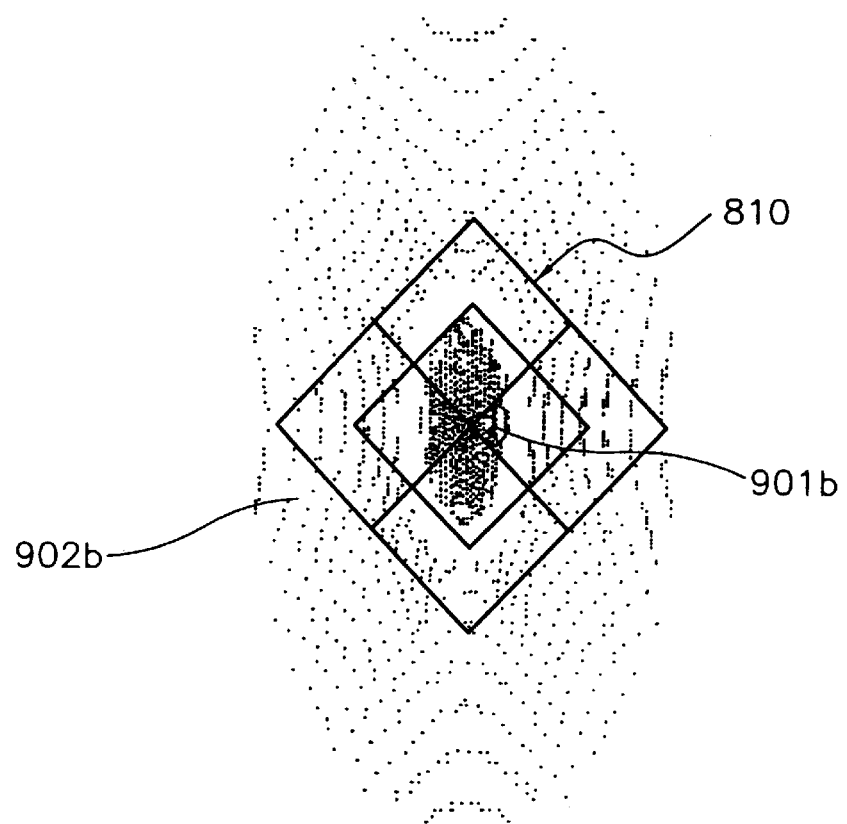

FIGS. 24, 25 and 26 show the light receiving states when an objective lens is in focus with respect to a thin disc, when the objective lens is positioned too far from the disc, and when the objective lens is positioned too near the disc, respectively. Similarly, FIGS. 27–29 show the light receiving states when an objective lens is in focus with respect to a thick disc, when it is positioned too far from the disc, and when it is positioned too near the disc, respectively.

In the photodetector 810 having the aforementioned structure, the entire signal, i.e., that from both the first and second light receiving regions 811 and 812, is used in reading information from a thin disc, and only the signal from the first light receiving region 811 is used in reading information from a thick disc.

FIG. 30 shows the focus error signal changes by the signal from the first light receiving region (solid line A) and by the entire signal from the first and second light receiving regions (dashed line B) when information read from a thick disc. The difference between the shapes indicated by the solid line A and the dotted line B comes from the amount of scattered light in a thick disc. In the octahedron photodetector 810, scattered light that is originated from a large spherical abberation of the thick disc is detected mainly by the outer photodetector 812. This scattered light detected by the outer photodetector 812 causes increase in the amplitude of the focus error signal which resulted an unstable focus error signal as shown in the dotted line B. And in turn, when only the detected light impinging on the inner photodetector 811 is used, it can be possible to reduce the effect of the scattered light on the S-curve as shown by the solid line A. In practical use, the focus error signal as denoted by A is better than B since it has a single zero-cross point for the focus error signal and the symmetry of the signal at the zero-cross point are important characteristics to identify the on-focus position of a objective lens.

As understood from the above, when information is read from a thick disc, the focus error signal components are obtained by using only the light of the near axis region, thereby obtaining a stable focus error signal as shown in FIG. 30.

As described above, in the focus controlling method of the objective lens device and optical pickup device adopting the same according to the present invention which has a size reducing effect of the light spot, i.e., the light amount of the portion "B" of FIG. 5, and a focus error signal stabilizing effect, since only a single focus error signal is generated irrespective of a disc thickness, an additional focus control means is not required in order to use the different thickness discs.

Figure 31:
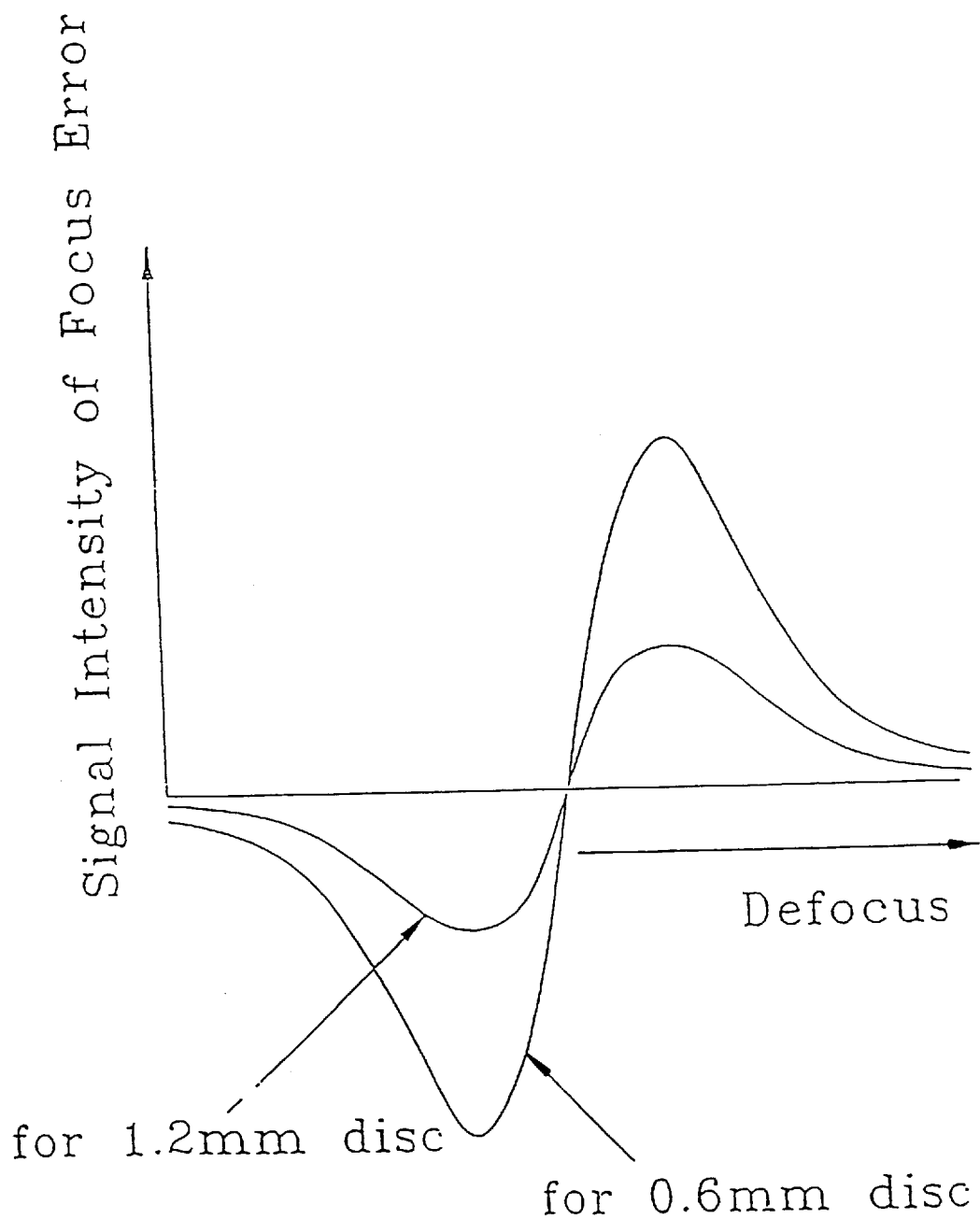
FIG. 31 is a graph for comparing the change of the focus signals detected by the photodetector in the optical pickup according to the present invention adopting two discs having different thicknesses.

Also, the magnitudes of the detected focus error signals are different depending on the disc thickness. In other words, as shown in FIG. 31, all of the light of the near and far axes regions reach a photodetector in the case of a thin disc, and only the light of the near axis region reaches the photodetector in the case of a thick disc, thereby easily discriminating the disc type.

The operation of discriminating the disc type will now be described in detail with reference to the flowchart of FIG. 32.

Figure 33:
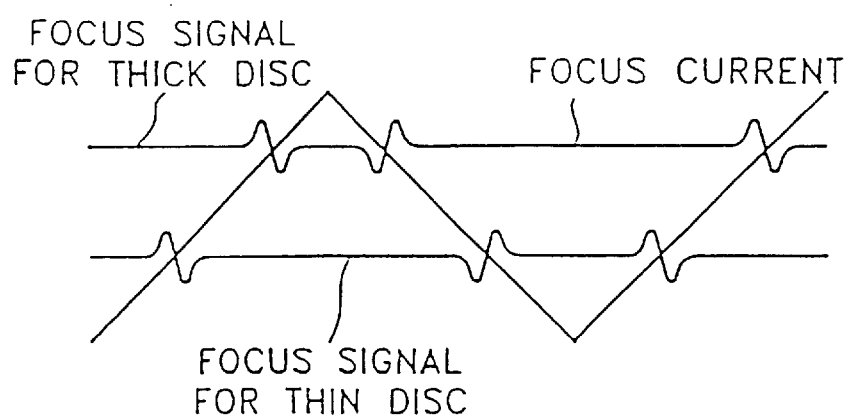
FIG. 33 shows the position where the focus signal is generated in a current-versus-time graph depending on the focus current variation, in the flowchart of FIG. 32.

If a thin or thick disc is inserted (step 100), focus current (which controls the position of the objective lens relative to the disc) is increased or decreased to discriminate the range of an objective lens, i.e., the type of a disc, as shown in FIG. 33. The objective lens is moved up and down m times (m=1, 2, 3, . . . ) within its range of focus adjustment, thereby obtaining a sum signal from the photodetector (adding together all signals from each of the eight quadrants) and a focus error signal ($S_f$) (step 101). Since a quadrant photodetector is used, the focus error signal is obtained by a conventional astigmatic method such as disclosed in U.S. Pat. No. 4,695,158 to Kotaka et al, for example. Being conventional, an explanation thereof will not be belabored. Experimentally it has been shown that the amplitude of the focus error signal for a thin disc reproduction is four times that for a thick disc reproduction, that the light intensity is enough for compatibility with both disc types and that a focus error signal stabilization is realized.

Figure 32:
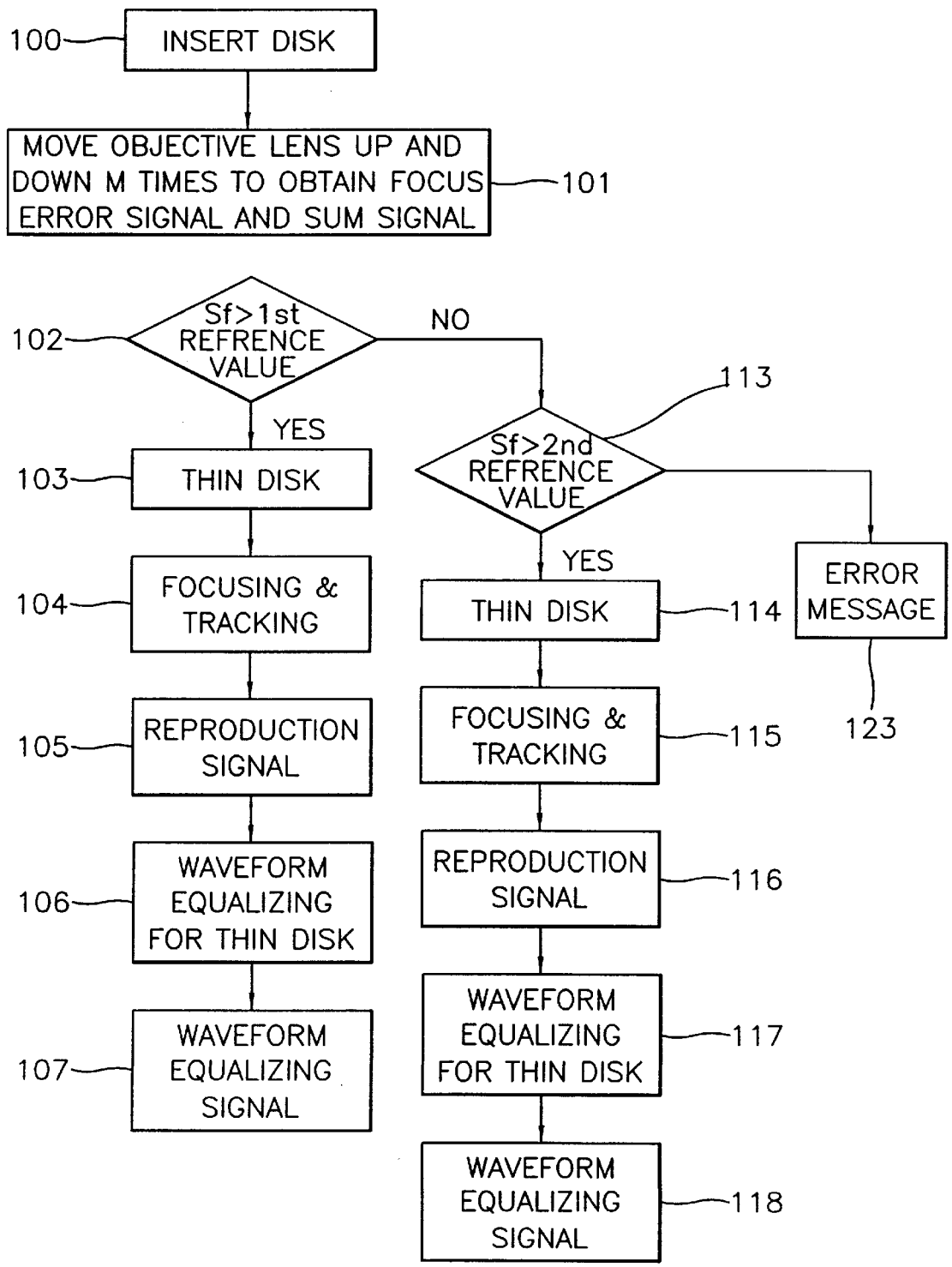
FIG. 32 is a flowchart showing the sequence of driving the optical pickup according to the present invention.
Figure 36:
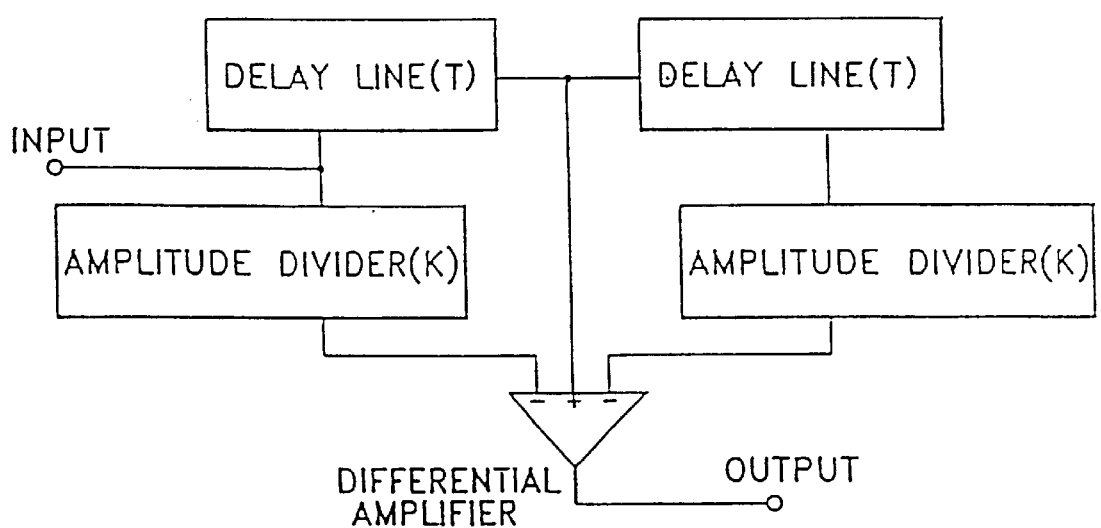
FIG. 36 is a block diagram of a digital equalizer used in the optical pickup according to the present invention.

The amount of spherical aberration is reduced by the above-described method to reproduce a signal recorded onto a disc. However, the spherical aberration is larger than that of the optical pickup for the conventional compact disc player, thereby resulting in the deterioration of a reproduction signal. Therefore, it is preferable that a digital waveform equalizer is used, such as shown in FIG. 36, which, assuming an input signal fi(t), produces an output signal fo(t) in accordance with $$fo(t)=fi(t+\tau)-K[fi(t)+fi(t+2\tau)]$$

where τ is a predetermined delay time, and K is a predetermined amplitude divider, as shown in FIG. 32 (steps 106 and 117).

Once the focus error signal $S_f$ and the sum signal are obtained (step 101), it is determined whether the focus error signal $S_f$ is greater than a first reference signal for a thin disc (step 102). At this time, the sum signal may be also compared with the first reference signal in accordance with the design conditions.

Figure 34:
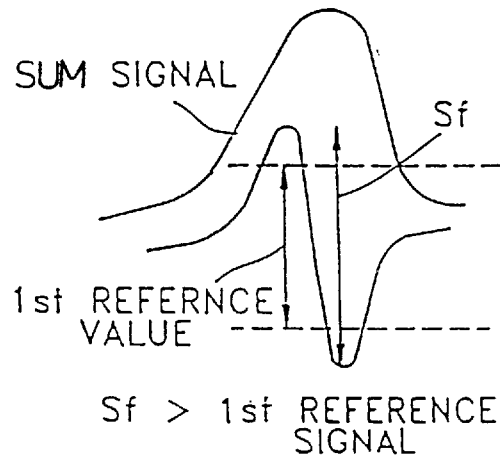
FIGS. 34 and 35 are current-versus-time graphs comparing the focus signal with the first and second reference values used in the flowchart of FIG. 32, respectively.

As shown in FIG. 34, if the first reference value is less than the focus signal $S_f$ or the sum signal, it is determined that the disc is thin (step 103) and focusing and tracking are continuously performed (step 104) in accordance with this determination, thereby obtaining a reproduction signal (step 105). The reproduction signal passes through a waveform equalizer (step 106) for a thin disc to obtain a waveform equalizing signal (step 107). However, if the first reference value is greater than the focus error signal $S_f$ or the sum signal, it is then determined whether the focus error signal is greater than the second reference value corresponding to the thick disc (step 113).

Figure 35:
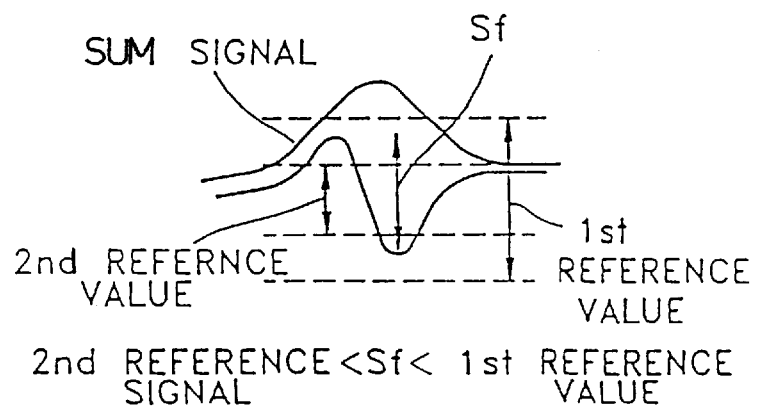

As shown in FIG. 35, if the first reference value is greater than the focus error signal $S_f$ or the sum signal and the focus error signal $S_f$ or the sum signal is greater than the second reference value (step 113), it is determined that the disc is thick (step 114) and focusing and tracking are continuously performed (step 115), thereby obtaining a reproduction signal (step 116). The reproduction signal passes through a waveform equalizer (step 117) for a thin disc to obtain a waveform equalizing signal (step 118).

If the focus error signal $S_f$ or the sum signal is smaller than a second reference signal, an error signal is generated (step 123). The focus error signal and the sum signal can be used to discriminate the disc type clearly and this method using both signals reduces the discrimination error.

As described above, the lens device according to the present invention has various advantages as follows.

The lens device according to the present invention adopts a light blocking or scattering means which is simple and easy to fabricate, instead of a complex and expensive hologram lens. Also, since the light can be used without being separated by a hologram lens, the lens device has higher light utilizing efficiency than that of the conventional device. In addition, since a very small beam spot is formed, the performance of recording and reproducing information can be enhanced. Since the lens device with a light blocking, refracting, diffracting or scattering means has a single objective lens, it is very simple to assemble and adjust the optical pickup adopting the lens device. Also, since a signal which can discriminate the disc type is always obtained regardless of the thickness of the discs, additional means is not required for discriminating the disc type. In contrast, the conventional device using hologram has to adopt additional means to discriminate some signals because the device generates multiple signals. Among the multiple signals, one is used for thin discs and another is used for thick discs.

While the invention has been particularly shown and described with reference to a preferred embodiments thereof, it will be understood by those skilled in the art that various other changes in form and details may be made therein without departing from the spirit and scope of the invention. For instance, the relative position of the discs in the light path can be altered, thereby changing the spot patterns and consequently the details of the various methods using the electrically converted spot patterns.

What is claimed is:

1. A lens device comprising:
    a lens focussing light into a focal zone and having a predetermined effective diameter; and
    light controlling means provided in a light path of said lens for preventing light in an intermediate axial region of said light path from reaching said focal zone, said intermediate axial region being located between near axial region which includes a center of said light path and a far axial region located radially outward from said intermediate region, said light controlling means permitting light in said near and far regions of said light path to reach said focal zone without imposing a relative phase change between light in said near and far regions.

2. A lens device according to claim 1, wherein said lens is an objective lens.

3. A lens device as claimed in claim 1, wherein said light controlling means blocks the light in the intermediate region of said light path.

4. A lens device as claimed in claim 1, wherein said light controlling means scatters the light in the intermediate region of said light path.

5. A lens device as claimed in claim 1, wherein said light controlling means diffracts the light in the intermediate region of said light path.

6. A lens device as claimed in claim 1, wherein said light controlling means absorbs the light in the intermediate region of said light path.

7. A lens device as claimed in claim 1, wherein said light controlling means reflects the light in the intermediate region of said light path.

8. A lens device as claimed in claim 1, wherein said light controlling means transmits the light in the intermediate region of said light path in a direction irrelevant to said focal zone.

9. A lens device as claimed in claim 1, wherein said light controlling means refracts the light in the intermediate region of said light path in a direction away from said focal zone.

10. A lens device as claimed in claim 2, wherein said light controlling means controls the light in the intermediate region between near and far axes of the incident light beam by at least one of blocking, scattering, diffracting, refracting, absorbing, transmitting, and reflecting.

11. A lens device as claimed in claim 1, wherein said light controlling means has a predetermined region for preventing light in an intermediate axial region of said light path from reaching said focal zone, said predetermined region having an outer diameter smaller than the effective diameter of said lens.

12. A lens device as claimed in claim 1, wherein said light controlling means is at least one light controlling film of a predetermined pattern located on said lens.

13. A lens device as claimed in claim 1, wherein said light controlling means includes a transparent member.

14. A lens device as claimed in claim 13, wherein said transparent member is spaced apart from said lens by a predetermined distance.

15. A lens device as claimed in claim 13, wherein said transparent member includes at least one light controlling film of a predetermined pattern.

16. A lens device as claimed in claim 1, wherein said light controlling means includes at least one light controlling film of a predetermined pattern located on said lens.

17. A lens device as claimed in claim 1, wherein said light controlling means includes at least one surface irregularity of a predetermined pattern.

18. A lens device as claimed in claim 17, wherein said at least one surface irregularity includes a groove having two converging side walls, the angle at a point of said conversion being less than 90°, wherein one of the side walls has a predetermined slope with respect to an axis of said light path.

19. A lens device as claimed in claim 18, wherein said groove is V-shaped.

20. A lens device as claimed in claim 1, wherein said light controlling means includes at least one surface irregularity of a predetermined pattern, and said at least one surface irregularity includes a groove which has parallel sides and said lens is a planar lens.

21. A lens device as claimed in claim 17, wherein said at least one surface irregularity includes a protruding wedge-shaped rib.

22. A lens device as claimed in claim 1, wherein said light controlling means includes at least one surface irregularity of a predetermined pattern, and said at least one surface irregularity includes a roughened surface.

23. A lens device as claimed in claim 17, wherein said surface irregularity includes a diffraction lattice for diffracting the light in said intermediate region of said light path away from said focal zone.

24. A lens device according to claim 1, wherein said lens has a refractive surface.

25. A lens device according to claim 1, wherein said lens is a diffractive lens.

26. A lens device according to claim 1, wherein said lens is a planar lens.

* * * * *